(12) United States Patent
Tanase et al.

(10) Patent No.: US 10,829,132 B2
(45) Date of Patent: Nov. 10, 2020

(54) VEHICLE BODY INCLINATION CONTROLLER AND FAILURE DETERMINATION DEVICE FOR VEHICLE BODY INCLINATION CONTROLLER

(71) Applicant: CENTRAL JAPAN RAILWAY COMPANY, Nagoya (JP)

(72) Inventors: Toshikatsu Tanase, Nagoya (JP); Tsukasa Hosomi, Nagoya (JP); Toru Tatsuno, Nagoya (JP); Kota Terada, Nagoya (JP)

(73) Assignee: CENTRAL JAPAN RAILWAY COMPANY, Nagoya (JP)

( * ) Notice: Subject to any disclaimer, the term of this patent is extended or adjusted under 35 U.S.C. 154(b) by 224 days.

(21) Appl. No.: 16/079,864

(22) PCT Filed: Feb. 24, 2017

(86) PCT No.: PCT/JP2017/007200
§ 371 (c)(1),
(2) Date: Aug. 24, 2018

(87) PCT Pub. No.: WO2017/146228
PCT Pub. Date: Aug. 31, 2017

(65) Prior Publication Data
US 2019/0054933 A1 Feb. 21, 2019

(30) Foreign Application Priority Data
Feb. 24, 2016 (JP) .................................. 2016-033514

(51) Int. Cl.
*B61F 5/14* (2006.01)
*B60G 17/0185* (2006.01)
(Continued)

(52) U.S. Cl.
CPC .......... *B61F 5/144* (2013.01); *B60G 17/0185* (2013.01); *B60G 99/00* (2013.01);
(Continued)

(58) Field of Classification Search
CPC .. B60G 17/0185; B60G 99/00; B60G 99/008; B61F 1/14; B61F 5/10; B61F 5/245; B61F 5/144; B61F 5/24; B61F 5/14
See application file for complete search history.

(56) References Cited

U.S. PATENT DOCUMENTS 3,774,549 A * 11/1973 Lich .................. B61F 5/144
105/182.1
3,789,771 A * 2/1974 Jackson .................. B61F 5/144
105/199.4
(Continued)

FOREIGN PATENT DOCUMENTS

JP 2015-147478 8/2015

OTHER PUBLICATIONS

English translation of International Search Report from corresponding PCT Appln. No. PCT/JP2017/007200, dated Apr. 4, 2017.
(Continued)

*Primary Examiner* — Jason C Smith
(74) *Attorney, Agent, or Firm* — Grossman, Tucker, Perreault & Pfleger, PLLC

(57) ABSTRACT

A vehicle body inclination controller includes an air spring, an air reservoir, valve devices, an acquisition section, and a determination section. The determination section compares, with a predetermined threshold, at least one of a value of a ratio between supply control information of a supply valve and exhaust control information of an exhaust valve in the same valve device among the valve devices, a value of a ratio between pieces of the supply control information of the supply valves of different valve devices among the valve
(Continued)

devices, or a value of a ratio between pieces of the exhaust control information of the exhaust valves of different valve devices among the valve devices, and determines that a failure occurs in the same valve device or at least one of the different valve devices when the value of the ratio exceeds the predetermined threshold.

9 Claims, 13 Drawing Sheets

(51) Int. Cl.

| | | |
|---|---|---|
| *B60G 99/00* | (2010.01) | |
| *B61F 5/10* | (2006.01) | |
| *B61F 5/24* | (2006.01) | |
| *B61F 1/14* | (2006.01) | |

(52) U.S. Cl.
CPC ............... *B61F 1/14* (2013.01); *B61F 5/10* (2013.01); *B61F 5/245* (2013.01)

(56) References Cited

U.S. PATENT DOCUMENTS

| | | | | |
|---|---|---|---|---|
| 4,029,305 A | * | 6/1977 | Schubert | B60G 17/052 267/64.23 |
| 4,695,074 A | * | 9/1987 | Kobayashi | B60G 17/0155 280/6.157 |
| 4,817,536 A | * | 4/1989 | Cripe | B60T 13/406 105/182.1 |
| 5,351,624 A | * | 10/1994 | Ahlborn | B61F 5/127 105/185 |
| 9,771,087 B2 | * | 9/2017 | Yamao | B61F 5/10 |
| 2012/0046830 A1 | * | 2/2012 | Hojak | B61F 5/245 701/37 |
| 2013/0180427 A1 | * | 7/2013 | Shinmura | B61F 5/10 105/199.1 |
| 2013/0313764 A1 | * | 11/2013 | Fujimoto | B61F 5/10 267/64.27 |
| 2013/0319284 A1 | * | 12/2013 | Shinmura | B61F 5/02 105/453 |
| 2016/0195151 A1 | * | 7/2016 | Prams | B60G 17/019 267/64.27 |
| 2016/0236532 A1 | * | 8/2016 | Moulik | B60G 17/0521 |
| 2016/0252153 A1 | * | 9/2016 | Haraguchi | F16F 1/40 267/64.27 |
| 2016/0264155 A1 | * | 9/2016 | Kamura | B61F 1/14 |
| 2017/0015334 A1 | * | 1/2017 | Haraguchi | F16F 9/05 |
| 2017/0204929 A1 | * | 7/2017 | Hart | B60G 11/27 |
| 2019/0054933 A1 | * | 2/2019 | Tanase | B61F 5/10 |

OTHER PUBLICATIONS

English translation of Written Opinion from corresponding PCT Appln. No. PCT/JP2017/007200, dated Apr. 4, 2017.

* cited by examiner

FIG. 10

| DETERMINATION PROCESS | OPERATION FREQUENCY RATIO | DETERMINABLE FAILURE |
|---|---|---|
| (1) | EXHAUST CONTROL INFORMATION AE / SUPPLY CONTROL INFORMATION AS | FIRST STATE ASO<br>FIRST STATE AEO |
| (2) | EXHAUST CONTROL INFORMATION BE / SUPPLY CONTROL INFORMATION BS | FIRST STATE BSO<br>FIRST STATE BEO |
| (3) | SUPPLY CONTROL INFORMATION BS / SUPPLY CONTROL INFORMATION AS | SECOND STATE ASC |
| (4) | EXHAUST CONTROL INFORMATION BE / EXHAUST CONTROL INFORMATION AE | SECOND STATE AEC |
| (5) | SUPPLY CONTROL INFORMATION CS / SUPPLY CONTROL INFORMATION BS | SECOND STATE BSC |
| (6) | EXHAUST CONTROL INFORMATION CE / EXHAUST CONTROL INFORMATION BE | SECOND STATE BEC |

VEHICLE BODY INCLINATION CONTROLLER AND FAILURE DETERMINATION DEVICE FOR VEHICLE BODY INCLINATION CONTROLLER

CROSS-REFERENCE TO RELATED APPLICATION

This international application claims the benefit of Japanese Patent Application No. 2016-033514, filed on Feb. 24, 2016 in the Japan Patent Office, and the entire disclosure of Japanese Patent Application No. 2016-033514 is incorporated herein by reference.

FIELD

The present disclosure relates to a vehicle body inclination controller of a railway vehicle and a failure determination device for a vehicle body inclination controller, and more particularly to a vehicle body inclination controller and a failure determination device for a vehicle body inclination controller capable of performing failure detection.

BACKGROUND

As railway vehicles, a configuration of providing at least railway trucks arranged at the front and rear of a traveling direction, a vehicle body arranged on these railway trucks, and air springs arranged between each of the railway trucks and the vehicle body is generally known. The air springs are arranged at both ends in a cross-tie direction of the railway truck and support the vehicle body by compressed air (air whose pressure is increased to be higher than atmospheric pressure) stored therein. The air spring expands so that a height position of the vehicle body moves upward when the compressed air is further supplied from an air reservoir to the air spring. The air spring contracts so that the height position of the vehicle body moves downward when the compressed air stored in the air spring is exhausted to the atmosphere. The cross-tie direction means a direction orthogonal to the traveling direction in the horizontal plane and does not mean a direction in which cross-ties are actually arranged to extend.

In recent years, control for inclining the vehicle body of the railway vehicle using the air spring has been developed (see, for example, Patent Document 1). In this vehicle body inclination control, when the railway vehicle travels on a curved track, control is performed to incline the vehicle body toward an inner rail side of the curved track. For example, control is performed to expand the air spring arranged on an outer rail side of the curved track to incline the vehicle body toward the inner rail side of the curved track before the railway vehicle reaches a circular curve of the curved track from a straight track. Thereafter, control is performed to contract the air spring arranged on the outer rail side of the curved track to restore the inclination such that the vehicle body becomes horizontal before the railway vehicle reaches the straight track from the circular curve of the curved track.

As the control for inclining the vehicle body is performed in this manner, it is possible to decrease the acceleration acting on the vehicle body outward in a radial direction of the curved track, that is, a centrifugal force applied to a passenger, and to improve ride comfort when the railway vehicle travels on the curved track. In addition, it is possible to improve vehicle speed when the railway vehicle travels on the curved track.

Furthermore, there have been developed a method and an apparatus for detecting whether a vehicle body is inclined as controlled and whether a failure occurs in a device that inclines a vehicle body including an air spring when performing the vehicle inclination control (see, for example, Patent Document 2). For example, there have been developed a method of detecting a failure or the like by monitoring displacement of a height position of a vehicle body caused by expansion and contraction of an air spring, a method of detecting a failure or the like by monitoring an air pressure of a flow path through which compressed air is supplied from an air reservoir to an air spring and an air pressure of a flow path through which compressed air is exhausted from the air spring to atmosphere, and the like.

PRIOR ART DOCUMENTS

Patent Documents

Patent Document 1: Japanese Unexamined Patent Application Publication No. 2015-147478
Patent Document 2: Japanese Unexamined Patent Application Publication No. 2015-147479

SUMMARY

Problems to be Solved by the Invention

However, there is a problem that it is difficult to accurately detect a failure or the like by the above-described method of monitoring the displacement of the height position of the vehicle body. That is, as described above, the railway trucks are arranged at the front and rear of the traveling direction for each vehicle in the railway vehicle, and the air springs are arranged at both ends of the railway truck in the cross-tie direction. For example, if a device that controls the air spring arranged on the railway truck at the rear side in the traveling direction normally operates even in a case where a device that controls the air spring arranged on the railway truck at the front side in the traveling direction has failed, the air spring arranged on the railway truck at the front side connected via the vehicle body also expands and contracts along with expansion and contraction of the air spring arranged on the railway truck at the rear side (although the amount of displacement is small compared with the case where there is no failure). That is, there is a problem that it is difficult to detect a failure of the device controlling the air spring arranged on the front-side railway truck.

In addition to this problem, when a system including a flow path and a control valve for supplying compressed air to an air spring and a system including a flow path and a control valve for exhausting compressed air are provided double or triple, there is a problem that it is difficult to detect a failure because the operation of the air spring is secured by another system provided double or triple even if a failure occurs in one system.

In the above-described method of detecting a failure or the like by monitoring the air pressure of the flow path, failure detection is performed by detecting the pressure of the compressed air flowing through the flow path from the air reservoir to the air spring and collating a result of detecting the pressure with a failure mode. Therefore, patterns that allow the failure determination are limited. Thus, there is a problem that it is difficult to determine a failure other than determinable patterns. Further, there is a problem that it is difficult to determine, as a failure, a transitional stage from a normal state to a failure state, such as, a stage in which the operation is incomplete compared with the normal state although not reaching the failure state, or a stage in which the operation shifts between the normal state and the failure state.

In one aspect of the present disclosure, it is desirable to provide a vehicle body inclination controller and a failure determination device for a vehicle body inclination controller capable of detecting a failure early and accurately.

Means for Solving the Problems

In the present disclosure, a vehicle body inclination controller is provided. The vehicle body inclination controller includes an air spring that is arranged at a position for supporting a vehicle body and that supports the vehicle body based on a pressure of air stored in the air spring; an air reservoir that stores high-pressure air pressurized to a pressure higher than the pressure of the air stored in the air spring and supplies the high-pressure air to the air spring; valve devices each of which includes a supply valve that controls supply of the high-pressure air from the air reservoir to the air spring and an exhaust valve controlling exhaust of the air stored in the air spring from the air spring to an outside, the valve devices being arranged in parallel in a path for supplying the high-pressure air from the air reservoir to the air spring and a path for exhausting the stored air from the air spring to the outside; a valve driver that outputs a signal to the supply valve for controlling the supply of the high-pressure air and a signal to the exhaust valve for controlling the exhaust of the stored air; an acquisition section that acquires supply control information which is information on a value relating to supply control of the high-pressure air in the supply valve and exhaust control information which is information on a value relating to exhaust control of the stored air in the exhaust valve; and a determination section that compares, with a predetermined threshold, at least one of a value of a ratio between the supply control information of the supply valve and the exhaust control information of the exhaust valve in the same valve device, a value of a ratio between pieces of the supply control information of the supply valves of different valve devices, or a value of a ratio between pieces of the exhaust control information of the exhaust valves of different valve devices, and determines that a failure occurs in the same valve device or at least one of the different valve devices when the value of the ratio exceeds the predetermined threshold.

In the present disclosure, a failure determination device for a vehicle body inclination controller is provided. The vehicle body inclination controller includes: an air spring that is arranged at a position for supporting a vehicle body and that supports the vehicle body based on a pressure of air stored in the air spring; an air reservoir that stores high-pressure air pressurized to a pressure higher than the pressure of the air stored in the air spring and supplies the high-pressure air to the air spring; valve devices each of which includes a supply valve controlling supply of the high-pressure air from the air reservoir to the air spring and an exhaust valve controlling exhaust of the air stored in the air spring from the air spring to an outside, the valve devices being arranged in parallel in a path for supplying the high-pressure air from the air reservoir to the air spring and a path for exhausting the stored air from the air spring to the outside; a valve driver that outputs a signal to the supply valve for controlling the supply of the high-pressure air and a signal to the exhaust valve for controlling the exhaust of the stored air; and an acquisition section that acquires supply control information which is information on a value relating to supply control of the high-pressure air in the supply valve and exhaust control information which is information on a value relating to exhaust control of the stored air in the exhaust valve. The failure determination device includes: a communication section that receives the supply control information and the exhaust control information acquired by the acquisition section; and a determination section that compares, with a predetermined threshold, at least one of a value of a ratio between the supply control information of the supply valve and the exhaust control information of the exhaust valve in the same valve device, a value of a ratio between pieces of the supply control information of the supply valves of different valve devices, or a value of a ratio between pieces of the exhaust control information of the exhaust valves of different valve devices, and determines that a failure occurs in the same valve device or at least one of the different valve devices when the value of the ratio exceeds the predetermined threshold.

With the vehicle body inclination controller and the failure determination device of the present disclosure, it is possible to detect a failure early and accurately by using the comparison of at least one of the value of the ratio between the supply control information and the exhaust control information of the same valve device, the value of the ratio between pieces of the supply control information, or the value of the ratio between pieces of the exhaust control information with the predetermined threshold for determination of occurrence of the failure in the valve devices.

For example, failure determination is performed based on the supply control information and the exhaust control information indicating an operation state of the valve device, and thus, erroneous detection of the failure is reduced as compared with a case of determining occurrence of a failure of the valve device based on a height position of the vehicle body, which can be changed also by a factor other than the failure of the valve device. In addition, since the failure determination is performed based on the operation state of the valve device, it is possible to detect a failure also in the case where a system for supplying compressed air to the air spring or the like is provided double or triple.

In addition, the failure determination is performed based on the comparison of at least one of the value of the ratio between the supply control information and the exhaust control information of the same valve device, the value of the ratio between pieces of the supply control information, or the value of the ratio between pieces of the exhaust control information with the predetermined threshold, and thus, it is easy to detect a failure also at an early stage in the course from the normal state to the failure state as compared with a case of performing failure determination based on a comparison with a failure mode prepared in advance.

It is preferable that at least one of the valve devices has a valve capacity, which is a flow rate of the high-pressure air passing through the supply valve in a predetermined time and a flow rate of the stored air passing through the exhaust valve in the predetermined time, different from a valve capacity of another valve device among the valve devices, and that the determination section compares, with the predetermined threshold, at least one of the value of the ratio between the supply control information and the exhaust control information of the same valve device, the value of the ratio between pieces of the supply control information of the different valve devices having adjacent valve capacities, or the value of the ratio between pieces of the exhaust control information of different valve devices having the adjacent valve capacities.

In this manner, in the case where the valve devices include valve devices having different valve capacities, the determination section determines occurrence of a failure by performing the comparison of at least one of the value of the ratio between the supply control information and the exhaust control information of the same valve device, the value of the ratio between pieces of the supply control information of the valve devices having the adjacent valve capacities, or the value of the ratio between pieces of the exhaust control information of the valve devices having adjacent valve capacities with the predetermined threshold. Thus, the failure can be detected early and accurately also for the valve devices having the different valve capacities.

It is preferable that the valve devices include: a first valve device having a first valve capacity; a second valve device having a second valve capacity with a larger flow rate of air passing through the second valve device in the predetermined time than the first valve capacity; and a third valve device having a third valve capacity with a larger flow rate of air passing through the third valve device in the predetermined time than the second valve capacity, and that the determination section compare, with the predetermined threshold, at least one of the value of the ratio between the supply control information and the exhaust control information of the same valve device, a value of a ratio between pieces of the supply control information of the first valve device and the second valve device, a value of a ratio between pieces of the supply control information of the second valve device and the third valve device, a value of a ratio between pieces of the exhaust control information of the first valve device and the second valve device, or a value of a ratio between pieces of the exhaust control information of the second valve device and the third valve device.

In this manner, in the case where the first valve device having the first valve capacity, the second valve device having the second valve capacity, and the third valve device having the third valve capacity are provided, the determination section determines occurrence of a failure by performing the comparison, with the predetermined threshold, of at least one of the value of the ratio between the supply control information and the exhaust control information of the same valve device, the value of the ratio between pieces of the supply control information of the first valve device and the second valve device, the value of the ratio between pieces of the supply control information of the second valve device and the third valve device, the value of the ratio between pieces of the exhaust control information of the first valve device and the second valve device, or the value of the ratio between pieces of the exhaust control information of the second valve device and the third valve device. As a result, failure can be detected early and accurately also for the valve devices having the different valve capacities.

In a first aspect of the disclosure, it is preferable to further provide a communication section that transmits the supply control information and the exhaust control information, acquired by the acquisition section, to the determination section.

As a transmitter is provided in this manner, it is possible to provide the determination section at a position away from the air spring, the air reservoir, the valve device, the valve driver, and the acquisition section. For example, it is possible to provide the determination section in a facility other than a vehicle such as a data analysis center while arranging the air spring, the air reservoir, the valve device, the valve driver, and the acquisition section in the vehicle having the vehicle body.

It is preferable that the valve driver output a signal for controlling opening and closing of the supply valve and a signal for controlling opening and closing of the exhaust valve, that the supply control information be the number of times of opening and closing of the supply valve during a predetermined period acquired by the acquisition section, and that the exhaust control information be the number of times of opening and closing of the exhaust valve during the predetermined period acquired by the acquisition section.

As the number of times of opening and closing of the supply valve is used as the supply control information, and the number of times of opening and closing of the exhaust valve is used as the exhaust control information in this manner, it is easy to acquire the supply control information and the exhaust control information as compared with the case of using the flow rate of air as the supply control information and the exhaust control information. For example, it is possible to acquire the supply control information and the exhaust control information by acquiring the signals output from the valve driver to the valve device.

In addition, the supply control information and the exhaust control information are binary information on valve opening and closing, and thus, the calculation performed during the determination is easier than in the case of using the flow rate of air or an opening degree of a valve as the supply control information and the exhaust control information.

It is preferable that the supply control information be a flow rate of the high-pressure air passing through the supply valve during a predetermined period acquired by the acquisition section, and that the exhaust control information be a flow rate of the stored air passing through the exhaust valve during the predetermined period acquired by the acquisition section.

As the flow rate of the high-pressure air passing through the supply valve is used as the supply control information and the flow rate of the stored air passing through the exhaust valve is used as the exhaust control information in this manner, a range of valve devices that allow failure determination is widened. More specifically, the failure determination can be performed not only for an on-off valve whose valve opening degree varies simply between opening and closing but also for a valve device using a flow control valve whose valve opening degree consecutively varies.

It is preferable that the valve driver output a signal for controlling an opening degree of the supply valve and a signal for controlling an opening degree of the exhaust valve, that the supply control information be opening degree information of the supply valve acquired by the acquisition section, and that the exhaust control information be opening degree information of the exhaust valve acquired by the acquisition section.

As the opening degree information of the supply valve is used as the supply control information and the opening degree information of the exhaust valve is used as the exhaust control information in this manner, the range of the valve devices that allow failure determination is widened. In addition, the supply control information and the exhaust control information can be acquired more easily than in the case of using the flow rate of air as the supply control information and the exhaust control information.

Effects of the Invention

With the vehicle body inclination controller and the failure determination device of the present disclosure, a failure can be detected early and accurately by using the comparison of at least one of the value of the ratio between the supply control information and the exhaust control information of the same valve device, the value of the ratio between pieces of the supply control information, or the value of the ratio between pieces of the exhaust control information with the predetermined threshold for determination of occurrence of the failure in the valve devices.

BRIEF DESCRIPTION OF THE DRAWINGS

FIG. 10 is a table illustrating contents of a failure determination process performed by a determination section.

FIG. 11 is a graph illustrating fluctuations of a value of exhaust control information AE and a value of supply control information AS.

EXPLANATION OF REFERENCE NUMERALS

10 . . . vehicle body inclination controller, 11 . . . air spring, 12 . . . air reservoir, 21A . . . first electromagnetic valve device (first valve device), 21B . . . second electromagnetic valve device (second valve device), 21C . . . third electromagnetic valve device (third valve device), 31S . . . supply valve, 31E . . . exhaust valve, 52 . . . valve driver, 53 . . . acquisition section, 54, 154 . . . determination section, 91 . . . vehicle body, 155 . . . vehicle-body-side communication section, 156 . . . determination-side communication section, 161 . . . failure determination device

DETAILED DESCRIPTION

First Embodiment

Figure 1A:
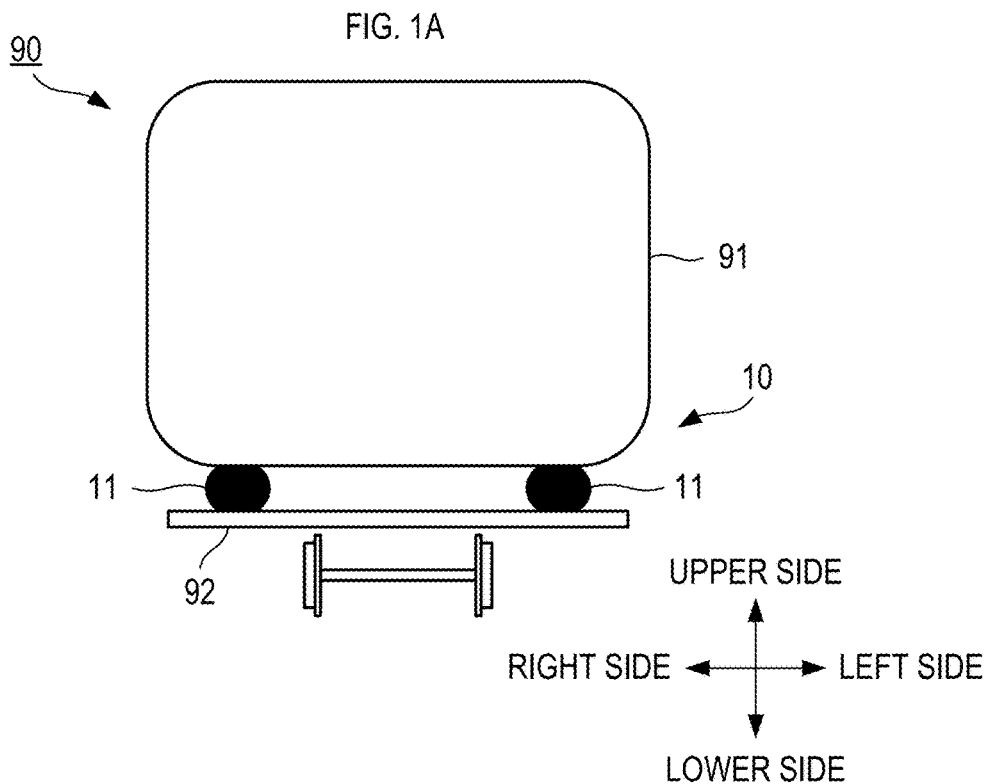
FIGS. 1A and 1B is a schematic view illustrating a configuration of a railway vehicle provided with a vehicle body inclination controller according to a first embodiment.
Figure 1B:
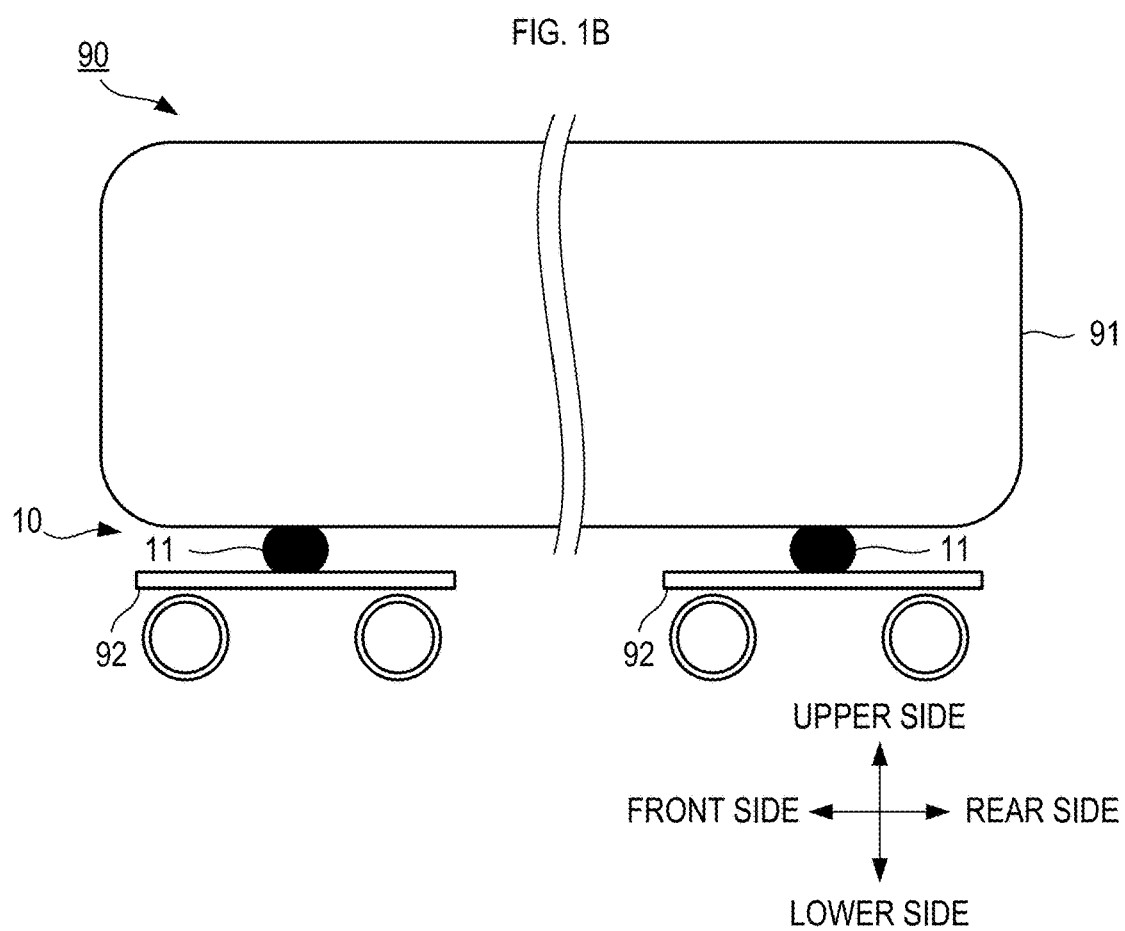

Hereinafter, a vehicle body inclination controller according to a first embodiment of the present disclosure will be described with reference to FIGS. 1A to 12. A description of the present embodiment will be given by applying the present disclosure to a vehicle body inclination controller 10 that controls an inclination of a vehicle body 91 of a railway vehicle 90. As illustrated in FIGS. 1A and 1B, the railway vehicle 90 comprises the vehicle body 91, railway trucks 92, and the vehicle body inclination controller 10. The vehicle body 91 has a space that allows passengers to ride and the like and is arranged above the railway trucks 92. The railway trucks 92 are used for traveling of the railway vehicle 90 and support the vehicle body 91 from below.

In the present embodiment, a railway truck 92 is arranged under each of front and rear portions in a traveling direction with respect to the single vehicle body 91. The number of railway trucks 92 arranged in the single vehicle body 91 is not limited. An example in which the railway truck 92 has two axles will be described in the present embodiment, but a single-axle railway truck 92 or a triple-axle railway truck 92 may be used, and the number of axles is not limited. Furthermore, an example in which the railway truck 92 is a bogie railway truck that is arranged to be relatively rotatable with respect to the vehicle body 91 about a rotation axis extending perpendicularly along a vertical direction will be described in the present embodiment, but the railway truck 92 is not limited to the bogie railway truck.

The vehicle body inclination controller 10 controls the expansion and contraction of an air spring 11 arranged between the railway trucks 92 and the vehicle body 91 and controls a height position of the vehicle body 91 with respect to the railway trucks 92 by the control of the air spring 11. Specifically, the vehicle body inclination controller 10 performs control to keep the height position of the vehicle body 91, which fluctuates as passengers get on and off the railway vehicle 90, within a certain range, control to incline the vehicle body 91 toward an inner rail side of a curved track when the railway vehicle 90 travels along the curved track, and the like.

Figure 2:
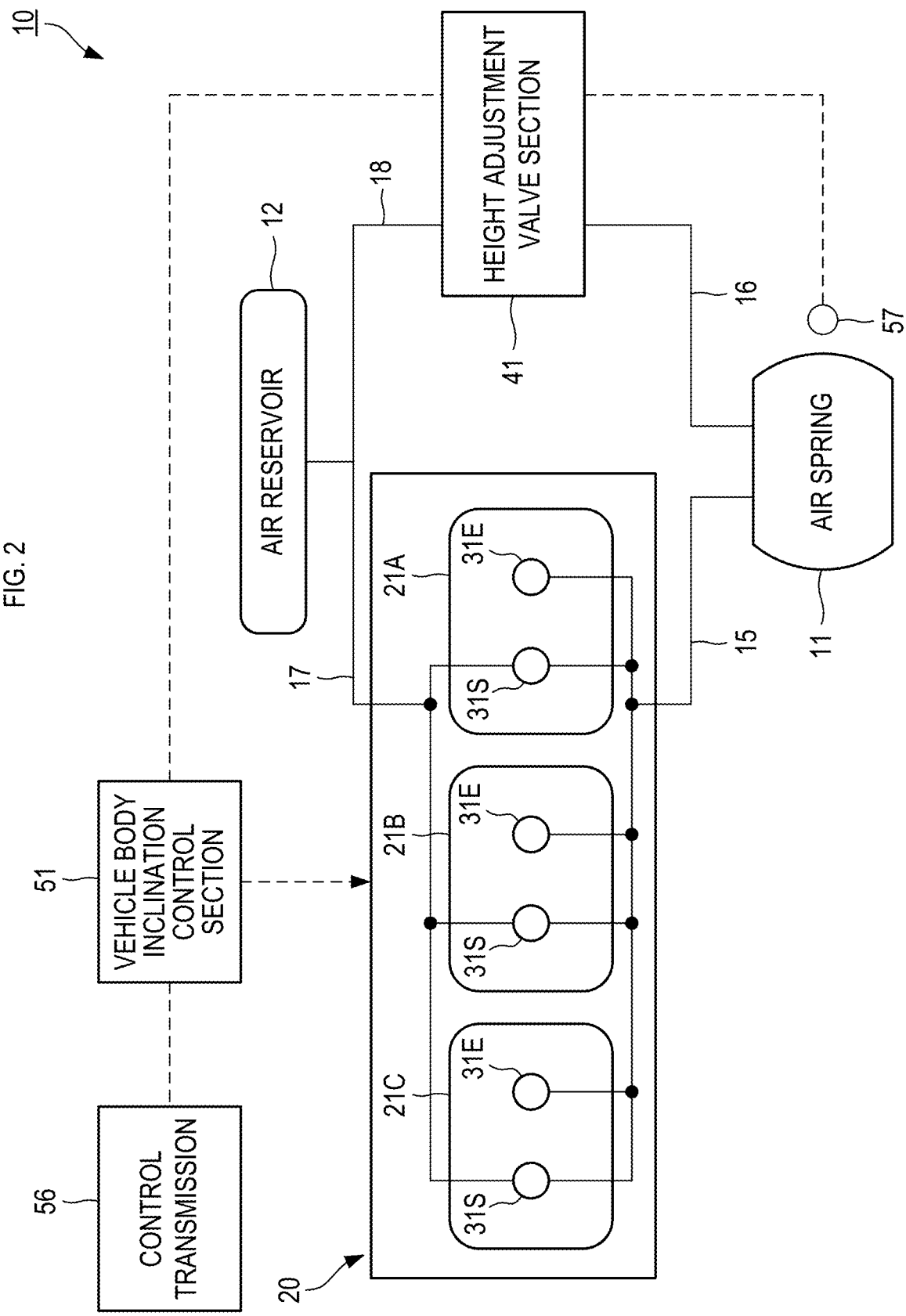
FIG. 2 is a schematic view illustrating a configuration of the vehicle body inclination controller in FIGS. 1A and 1B.
Figure 3:
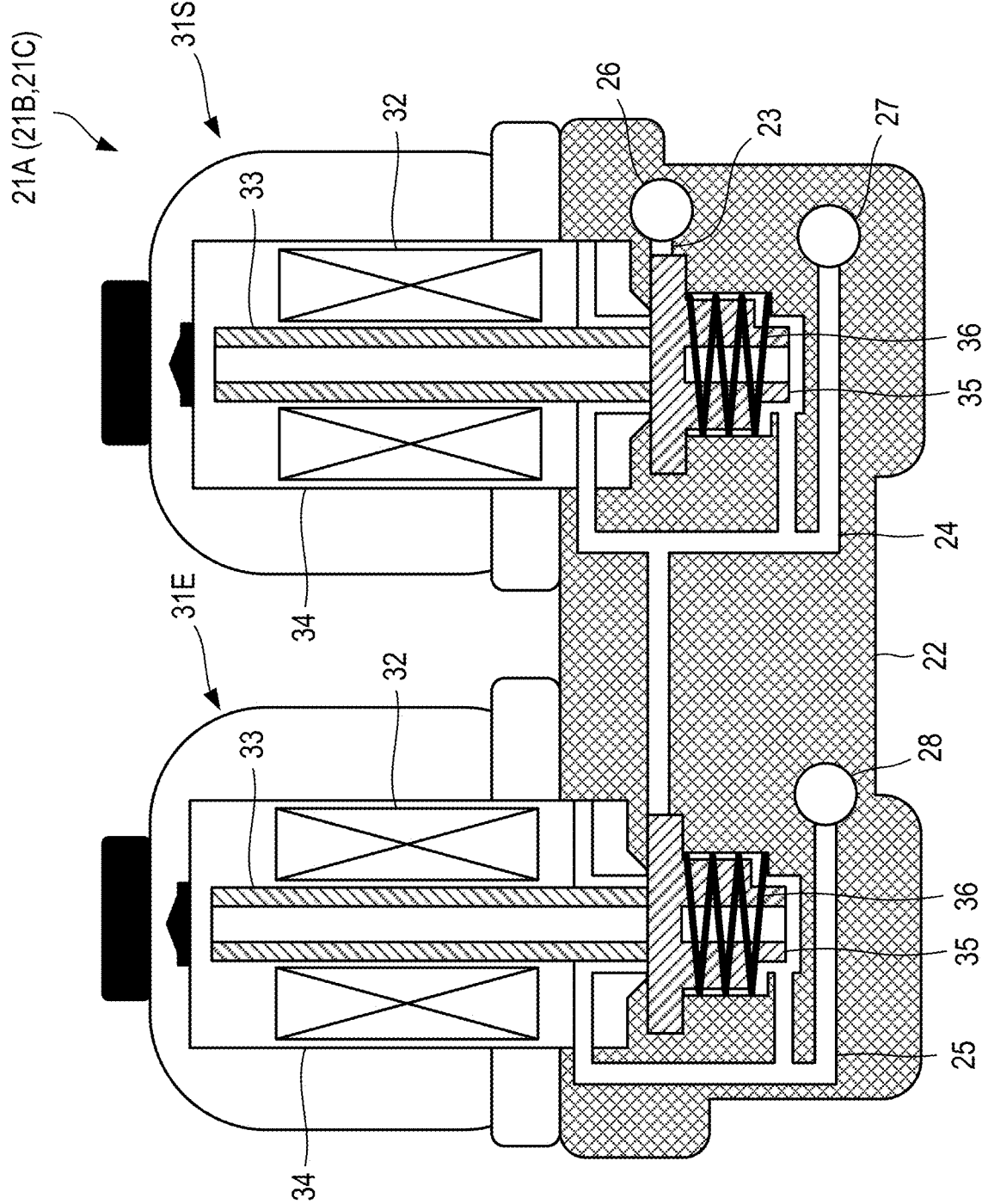
FIG. 3 is a schematic view illustrating a configuration of a first electromagnetic valve device in FIGS. 1A and 1B.

As illustrated in FIG. 2, the vehicle body inclination controller 10 comprises the air spring 11, an air reservoir 12, an electromagnetic valve system 20, a height adjustment valve section 41, and a vehicle body inclination control section 51.

In the present embodiment, the front and rear of the railway vehicle in the traveling direction will be referred to as the front side and the rear side, respectively. A direction orthogonal to the traveling direction in a horizontal direction will be referred to as a cross-tie direction. The right and left in the cross-tie direction, when facing the front side in the traveling direction, will be referred to as a right side and a left side, respectively. The up and down of the vertical direction will be referred to as an upper side and a lower side, respectively.

The air spring 11 is arranged at each of end regions of the railway truck 92 on the right side and the left side in the cross-tie direction between the railway truck 92 and the vehicle body 91 to support the vehicle body 91. In the present embodiment, four air springs 11 are provided for the one vehicle body 91 of the railway vehicle 90. Specifically, one air spring 11 is provided on a right portion of the railway truck 92 on the front side of the vehicle body 91, and one air spring 11 is arranged on a left portion of the same truck 92 (see, FIGS. 1A and 1B). One air spring 11 is arranged on a right portion of the railway truck 92 on the rear side, and one air spring 11 is arranged on a left portion of the same truck 92 (see FIGS. 1A and 1B).

The air spring 11 supports the vehicle body 91 so as to be capable of changing a height position of the vehicle body 91 based on a pressure of air stored in the air spring 11. The air spring 11 is connected with an inclination flow path 15 that enables flow of air between the air spring 11 and the electromagnetic valve system 20 and a height adjustment flow path 16 that enables flow of air between the air spring 11 and the height adjustment valve section 41. The configuration of the air spring 11 may be any configuration as long as it is possible to support the vehicle body 91 so as to be capable of changing the height position of the vehicle body 91, and its configuration is not limited.

The air reservoir 12 is a container in which high-pressure air pressurized to a higher pressure than a pressure of the air stored in the air spring 11 is stored, and supplies the high-pressure air to the air spring 11. Examples of the high-pressure air stored in the air reservoir 12 may include atmosphere increased in pressure by a compression means such as an air compressor. The air reservoir 12 is connected with an inclination-side supply flow path 17 that enables supply of the high-pressure air to the electromagnetic valve system 20 and a height-adjustment-side flow path 18 that enables supply of the high-pressure air to the height adjustment valve section 41. The configuration of the air reservoir 12 may be any configuration as long as it is possible to store the high-pressure air, and its configuration is not limited.

In the present embodiment, the single air reservoir 12 is arranged in the single vehicle body 91, and the high-pressure air is supplied from the single air reservoir 12 to the four air springs 11 arranged in the same vehicle body 91. The number of the air reservoirs 12 arranged in the single vehicle body 91 is not limited to one, and two or more air reservoirs 12 may be arranged, or the single air reservoir 12 may be provided for two or more vehicle bodies 91. In addition, the number of the air springs 11, to which the high-pressure air is supplied from the single air reservoir 12, may be four, or more or less than four.

The electromagnetic valve system 20 controls the supply of the high-pressure air to the air spring 11 and exhaust of the air stored in the air spring 11 to the atmosphere based on a control signal from the vehicle body inclination control section 51. In the present embodiment, the single electromagnetic valve system 20 is arranged for the single air spring 11. Alternatively, the single electromagnetic valve system 20 may be arranged for two or more air springs 11, or two or more electromagnetic valve systems 20 may be arranged for the single air spring 11 as long as they are configured such that the inclination of the vehicle body 91 can be controlled.

In the present embodiment, the electromagnetic valve system 20 comprises a first electromagnetic valve device (first valve device) 21A having a first valve capacity, a second electromagnetic valve device (second valve device) 21B having a second valve capacity larger than the first valve capacity, and a third electromagnetic valve device (third valve device) 21C having a third valve capacity larger than the second valve capacity. The valve capacity indicates a flow rate of air passing through an electromagnetic valve device per a predetermined time.

The first electromagnetic valve device 21A, the second electromagnetic valve device 21B, and the third electromagnetic valve device 21C have the same configuration although having different valve capacities. So, the configuration of the first electromagnetic valve device 21A will be described with reference to FIG. 3, and the description regarding the configurations of the second electromagnetic valve device 21B and the third electromagnetic valve device 21C will be omitted.

The first electromagnetic valve device 21A is an electromagnetic valve arranged between the air reservoir 12 and the air spring 11 in parallel to the second electromagnetic valve device 21B and the third electromagnetic valve device 21C. The first electromagnetic valve device 21A controls the supply of the high-pressure air from the air reservoir 12 to the air spring 11 and controls the exhaust of the air stored in the air spring 11 to the atmosphere.

The first electromagnetic valve device 21A comprises a valve body 22, a supply valve 31S, and an exhaust valve 31E.

The valve body 22 constitutes the first electromagnetic valve device 21A together with the supply valve 31S and the exhaust valve 31E, and constitutes a part of an outer shape of the supply valve 31S and the exhaust valve 31E. Further, the valve body 22 comprises a valve body supply flow path 23, a valve body intermediate flow path 24, a valve body exhaust flow path 25, a supply-side opening 26, an air-spring-side opening 27, and an exhaust-side opening 28.

The valve body supply flow path 23 is a flow path connecting the supply valve 31S and the supply-side opening 26 so as to enable flow of air therebetween. The valve body intermediate flow path 24 is a flow path connecting the supply valve 31S, the air-spring-side opening 27, and the exhaust valve 31E so as to enable flow of air thereamong. The valve body exhaust flow path 25 is a flow path connecting the exhaust valve 31E and the exhaust-side opening 28 so as to enable flow of air therebetween.

The supply-side opening 26 is an opening connecting with the inclination-side supply flow path 17 so as to enable flow of air therebetween. The air-spring-side opening 27 is an opening connecting with the inclination flow path 15 so as to enable flow of air therebetween. The exhaust-side opening 28 is an opening opened to the atmosphere.

The supply valve 31S is an electromagnetic valve that controls the supply of the high-pressure air from the air reservoir 12 to the air spring 11. The exhaust valve 31E is an electromagnetic valve that controls the exhaust of the air stored in the air spring 11 to the atmosphere. The supply valve 31S enables flow of air between the supply-side opening 26 and the air-spring-side opening 27. The exhaust valve 31E enables flow of air between the air-spring-side opening 27 and the exhaust-side opening 28. In the present embodiment, the description will be given by using an example in which the supply valve 31S and the exhaust valve 31E are electromagnetic valves having the same configuration, and thus, elements constituting the supply valve 31S and the exhaust valve 31E will be described with the same reference numerals.

Each of the supply valve 31S and the exhaust valve 31E comprises an electromagnet 32, a rod 33, a valve main body 34, a valve member 35, and a spring 36. Supply of a current to the electromagnet 32 for generating a magnetic force is controlled by the vehicle body inclination control section 51, and valve opening and closing in the supply valve 31S and the exhaust valve 31E is controlled by the generated magnetic force.

The rod 33 is a columnar member that moves in an axial direction due to the magnetic force generated by the electromagnet 32, and one end thereof abuts or is connected to the valve member 35. The valve main body 34 accommodates at least the electromagnet 32 and the rod 33 therein, and performs opening and closing of a flow path of air together with the valve member 35. A flow path connecting to the valve body intermediate flow path 24 so as to enable flow of air is formed inside the valve main body 34 of the supply valve 31S. A flow path connecting to the valve body exhaust flow path 25 so as to enable flow of air is formed inside the valve main body 34 of the exhaust valve 31E.

The valve member 35 performs the valve opening and closing in the supply valve 31S and the exhaust valve 31E. A position of the valve member 35 is changed by the electromagnet 32, the rod 33, and the spring 36. The spring 36 generates a biasing force to push the valve member 35 toward the valve main body 34.

In the present embodiment, the first electromagnetic valve device 21A, the second electromagnetic valve device 21B, and the third electromagnetic valve device 21C are electromagnetic valves whose valve opening and closing is controlled by the electromagnets. A valve whose valve opening and closing is controlled by an air pressure or a valve whose valve opening and closing is controlled by a hydraulic pressure may be used as each of the first electromagnetic valve device 21A, the second electromagnetic valve device 21B, and the third electromagnetic valve device 21C, and valve types are not limited.

The height adjustment valve section 41 performs the control to keep the height position of the vehicle body 91, which fluctuates as the passengers get on and off the railway vehicle 90, within the certain range. Examples of the configuration of the height adjustment valve section 41 may include a configuration disclosed in Japanese Unexamined Patent Application Publication No. 2015-147478, but other known configurations may be used, and the configuration is not limited.

Figure 4:
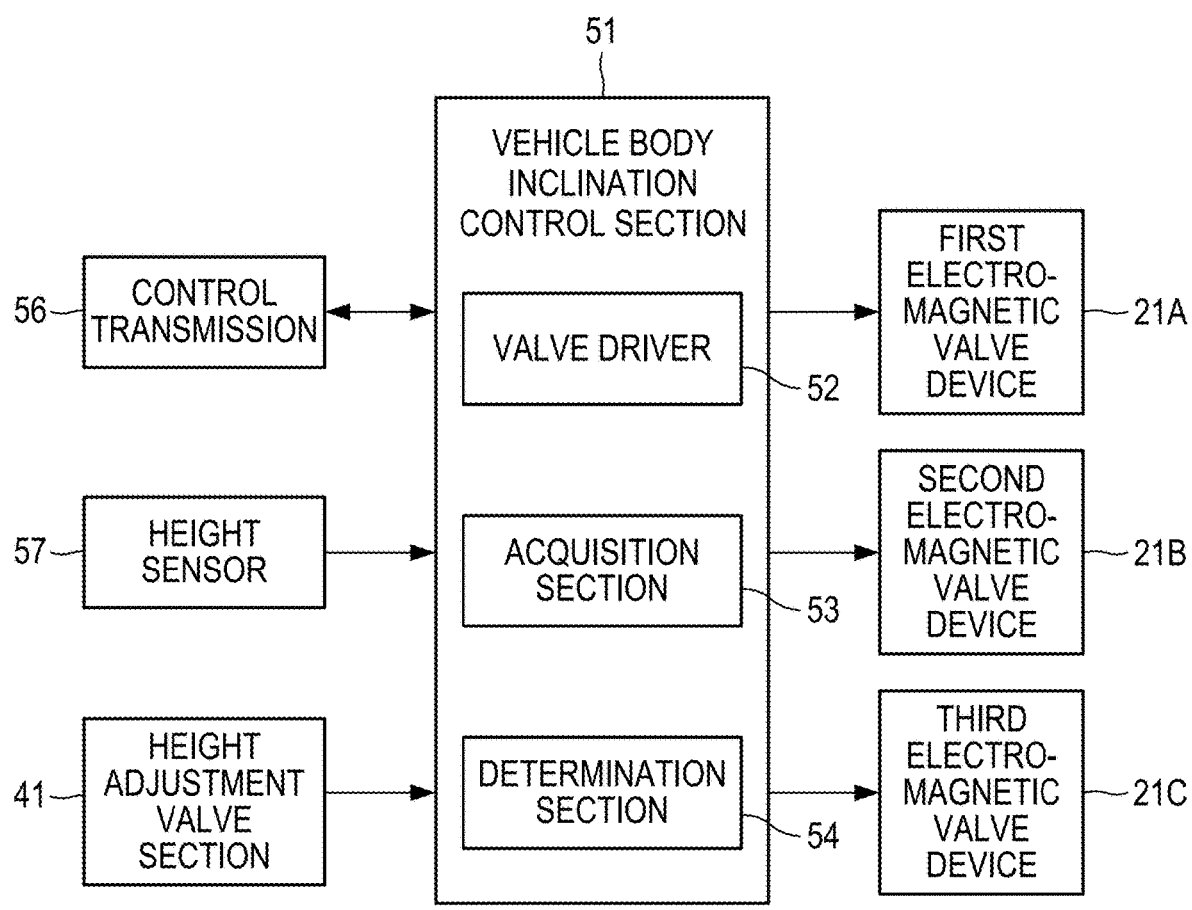
FIG. 4 is a block diagram illustrating a configuration of a vehicle body inclination control section in FIGS. 1A and 1B.

The vehicle body inclination control section 51 performs control to incline the vehicle body 91 toward the inner rail side of the curved track, control to restore the inclination such that the vehicle body 91 becomes horizontal, and the like. The vehicle body inclination control section 51 is a microcomputer having a central processing unit (CPU), a ROM, a RAM, an input/output interface, and the like. As illustrated in FIG. 4, a control program stored in a storage device such as the ROM causes the CPU, the input/output interface, and the like to function as a valve driver 52, an acquisition section 53, and a determination section 54.

The vehicle body inclination control section 51 is connected with a control transmission 56 such that information can be input to and output from the control transmission 56. The vehicle body inclination control section 51 is connected with a height sensor 57 such that information on the height position of the vehicle body 91 input from the height sensor 57 can be input to the vehicle body inclination control section 51. Further, the vehicle body inclination control section 51 is connected with the height adjustment valve section 41 such that information on an operation condition of the height adjustment valve section 41 can be input thereto.

The control transmission 56 outputs control signals instructing the control to incline the vehicle body 91 toward the inner rail side of the curved track and the control to restore the inclination such that the vehicle body 91 becomes horizontal, respectively, to the vehicle body inclination control section 51. The height sensor 57 is a sensor that senses the height position of the vehicle body 91. Examples of the height sensor 57 can include a sensor that measures a length in the vertical direction from a predetermined reference point such as the railway truck 92 to a predetermined position of the vehicle body 91.

The valve driver 52 controls the valve opening and closing in the first electromagnetic valve device 21A, the second electromagnetic valve device 21B, and the third electromagnetic valve device 21C to control the supply of the high-pressure air from the air reservoir 12 to the air spring 11 and control the exhaust of the air stored in the air spring 11 to the atmosphere.

More specifically, the opening and closing of the supply valve 31S of the first electromagnetic valve device 21A, the supply valve 31S of the second electromagnetic valve device 21B, and the supply valve 31S of the third electromagnetic valve device 21C are controlled to control the supply of the high-pressure air from the air reservoir 12 to the air spring 11. Also, the opening and closing of the exhaust valve 31E of the first electromagnetic valve device 21A, the exhaust valve 31E of the second electromagnetic valve device 21B, and the exhaust valve 31E of the third electromagnetic valve device 21C are controlled to control the exhaust of the air stored in the air spring 11 to the atmosphere.

The valve driver 52 may directly output a drive current to control the valve opening and closing in the first electromagnetic valve device 21A, the second electromagnetic valve device 21B, and the third electromagnetic valve device 21C. Alternatively, the valve driver 52 may output a control signal for controlling supply of a drive current to a power supply that is arranged separately from the vehicle body inclination control section 51 and that supplies the drive current to the first electromagnetic valve device 21A, the second electromagnetic valve device 21B, and the third electromagnetic valve device 21C. Specific contents of the valve opening and closing control in the first electromagnetic valve device 21A, the second electromagnetic valve device 21B, and the third electromagnetic valve device 21C performed by the valve driver 52 will be described later.

The acquisition section 53 acquires supply control information, which is information on the number of times of valve opening and closing in the supply valve 31S, and exhaust control information which is information on the number of valve opening and closing in the exhaust valve 31E. The acquisition section 53 may acquire the supply control information from the supply valve 31S and acquire the exhaust control information from the exhaust valve 31E. The acquisition section 53 may directly acquire control information for opening and closing a valve from the valve driver 52. The acquisition section 53 may acquire the drive current or the control signal output from the valve driver 52. The supply control information and the exhaust control information acquired by the acquisition section 53 are output to the determination section 54.

The determination section 54 determines occurrence of a failure in the first electromagnetic valve device 21A, the second electromagnetic valve device 21B, and the third electromagnetic valve device 21C based on the supply control information and the exhaust control information. Details of a failure determination method in the determination section 54 will be described later.

Next, an operation of the vehicle body inclination controller 10 having the above configuration will be described. First, inclination control of the vehicle body 91 performed by the vehicle body inclination controller 10 will be described. Then, the failure determination method in the determination section 54 of the vehicle body inclination controller 10 will be described.

Before the railway vehicle 90 reaches a circular curve of a curved track from a straight track, the control signal for inclining the vehicle body 91 toward the inner rail side of the curved track by expanding the air spring 11 arranged on an outer rail side of the curved track is input from the control transmission 56 to the vehicle body inclination controller 10. The valve driver 52 of the vehicle body inclination controller 10 performs the control for supplying the high-pressure air to the air spring 11 arranged on the portion on the outer rail side of the curved track. More specifically, the control is performed on the electromagnetic valve system 20 corresponding to the air spring 11 arranged on the portion on the outer rail side of the curved track to supply the high-pressure air from the air reservoir 12 to the air spring 11.

The electromagnetic valve system 20 comprises the first electromagnetic valve device 21A, the second electromagnetic valve device 21B, and the third electromagnetic valve device 21C having the different valve capacities. The electromagnetic valve device to be used for the supply control of the high-pressure air may be selected based on a degree of inclining the vehicle body 91 and temporal margin allowed for the inclining operation.

For example, the first electromagnetic valve device 21A is selected when the degree of inclining the vehicle body 91 is small and the temporal margin is secured. The third electromagnetic valve device 21C is selected when the degree of inclining the vehicle body 91 is large and the temporal margin is short.

Based on the control information input from the control transmission 56, the valve driver 52 selects one of the first electromagnetic valve device 21A, the second electromagnetic valve device 21B, and the third electromagnetic valve device 21C to control the valve opening and closing, and outputs the control signal for controlling the valve opening and closing. In the present embodiment, a description will be given by using an example in which the first electromagnetic valve device 21A is selected.

Figure 5A:
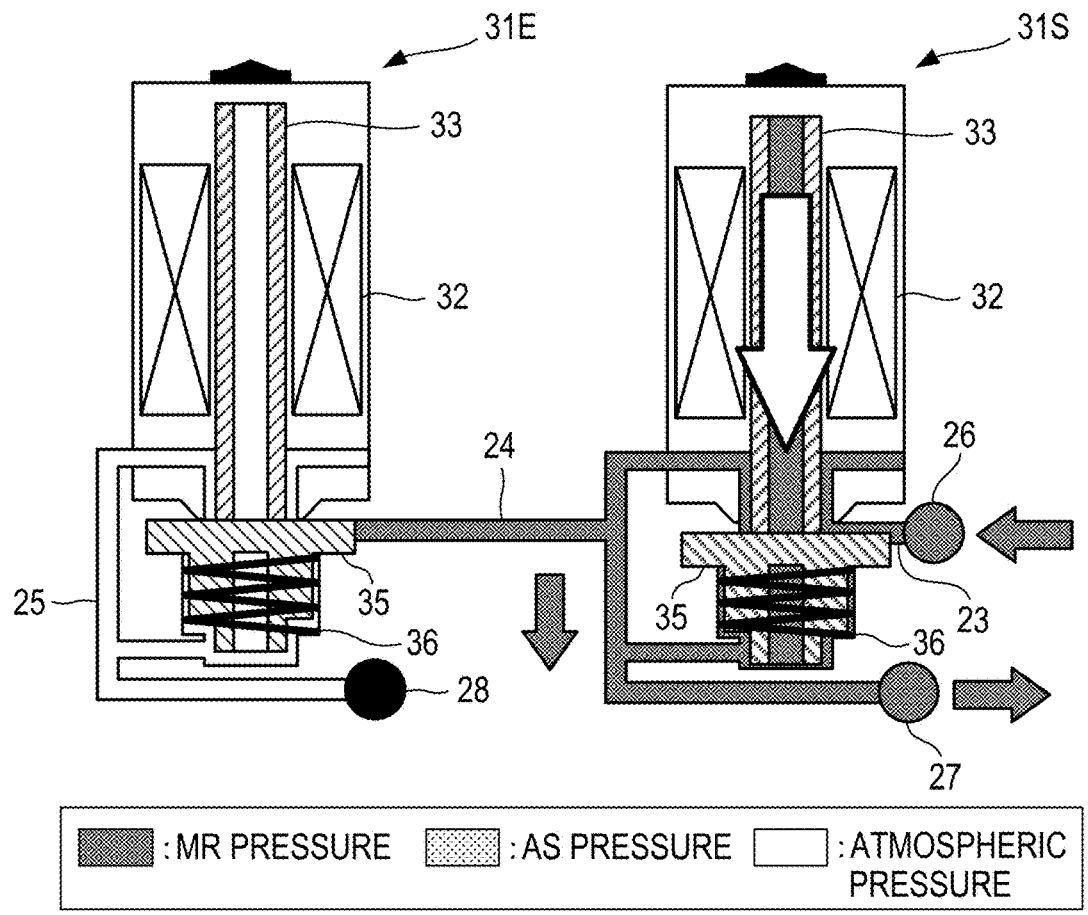
FIG. 5A is a schematic view illustrating an operation of the first electromagnetic valve device.

The valve driver 52 outputs a drive current for opening a valve to the supply valve 31S of the first electromagnetic valve device 21A. As illustrated in FIG. 5A, the rod 33 and the valve member 35 are pushed down by the magnetic force generated in the electromagnet 32 in the supply valve 31S, whereby the valve is opened. As a result, the high-pressure air flows from the supply-side opening 26 to the air-spring-side opening 27 via the valve body supply flow path 23 and the valve body intermediate flow path 24. At this time, the valve is closed in the exhaust valve 31E. In FIG. 5A, a space in which the high-pressure air flows is expressed as an MR pressure.

Figure 5B:
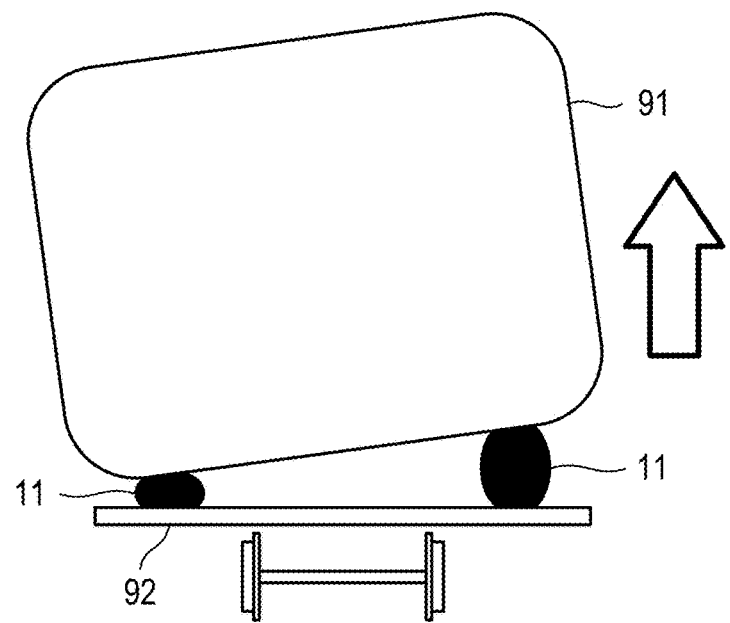
FIG. 5B is a schematic view illustrating an inclination of a vehicle body.

The high-pressure air flows from the air-spring-side opening 27 into the air spring 11 via the inclination flow path 15. The air spring 11 into which the high-pressure air has flowed expands so that the vehicle body 91 is inclined as illustrated in FIG. 5B. The inclination of the vehicle body 91 is sensed based on the height position of the vehicle body 91 measured by the height sensor 57. The supply of the high-pressure air to the air spring 11 is continued until the inclination of the vehicle body 91 reaches the inclination based on the control information input from the control transmission 56.

Figure 6A:
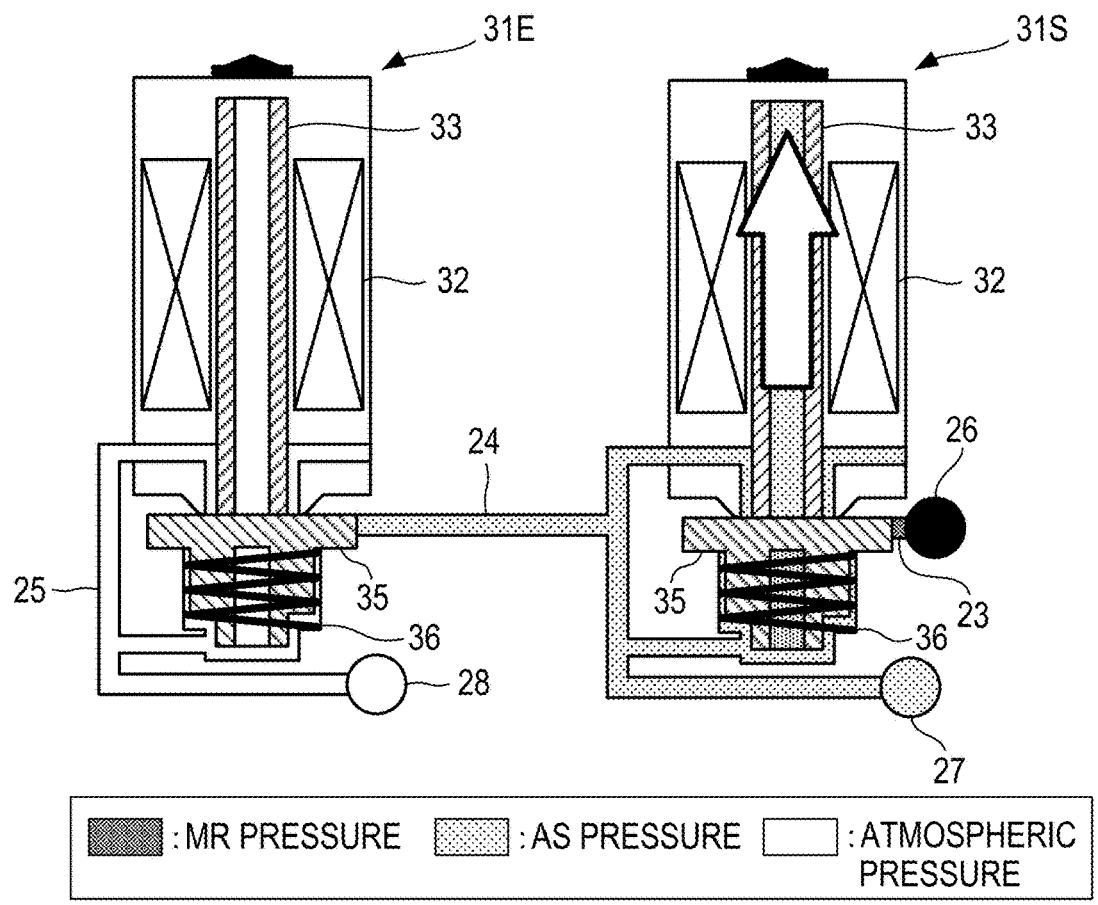
FIG. 6A is a schematic view illustrating the operation of the first electromagnetic valve device.
Figure 6B:
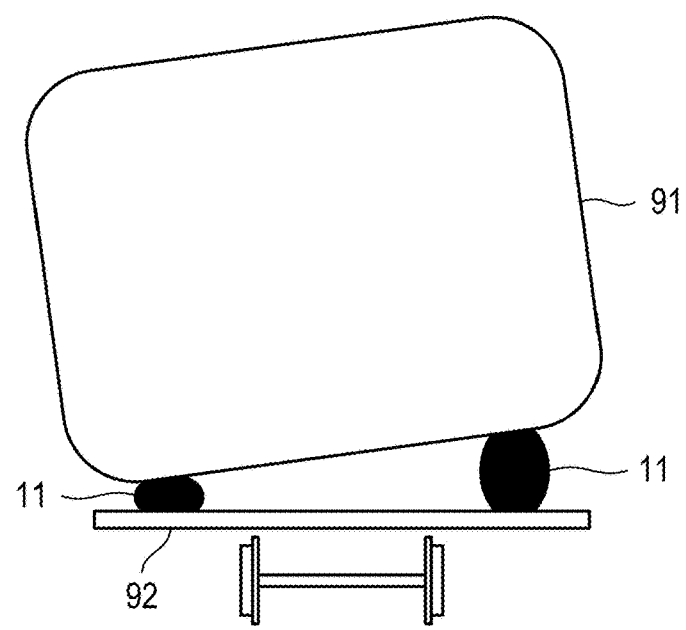
FIG. 6B is a schematic view illustrating the inclination of the vehicle body.

When the inclination of the vehicle body 91 reaches the inclination based on the control information input from the control transmission 56, the valve driver 52 performs control to stop the supply of the drive current for opening the valve. As illustrated in FIG. 6A, the valve member 35 and the rod 33 are pushed upward by the biasing force of the spring 36 in the supply valve 31S, whereby the valve is closed. At this time, the valve is also closed in the exhaust valve 31E. As a result, the air-spring-side opening 27 and the valve body intermediate flow path 24 connected to the air spring 11 are disconnected from the supply-side opening 26 and the exhaust-side opening 28. As illustrated in FIG. 6B, the air spring 11 into which the high-pressure air has flowed is held in an expanded length, and the vehicle body 91 is held in the inclined state.

At this time, the pressure (AS pressure) of the air stored in the air spring 11 has a lower value than the pressure (MR pressure) of the high-pressure air. In FIG. 6A, a space filled with the stored air is expressed as the AS pressure.

Thereafter, the control is performed on the vehicle body inclination controller 10 from the control transmission 56 so as to contract the air spring 11 arranged on the portion on the outer rail side of the curved track to restore the inclination such that the vehicle body 91 becomes horizontal before the railway vehicle 90 reaches the straight track from the circular curve of the curved track. The valve driver 52 of the vehicle body inclination controller 10 performs control on the electromagnetic valve system 20 corresponding to the air spring 11 arranged on the portion on the outer rail side of the curved track so as to exhaust the air stored in the air spring 11 to the atmosphere.

Figure 7A:
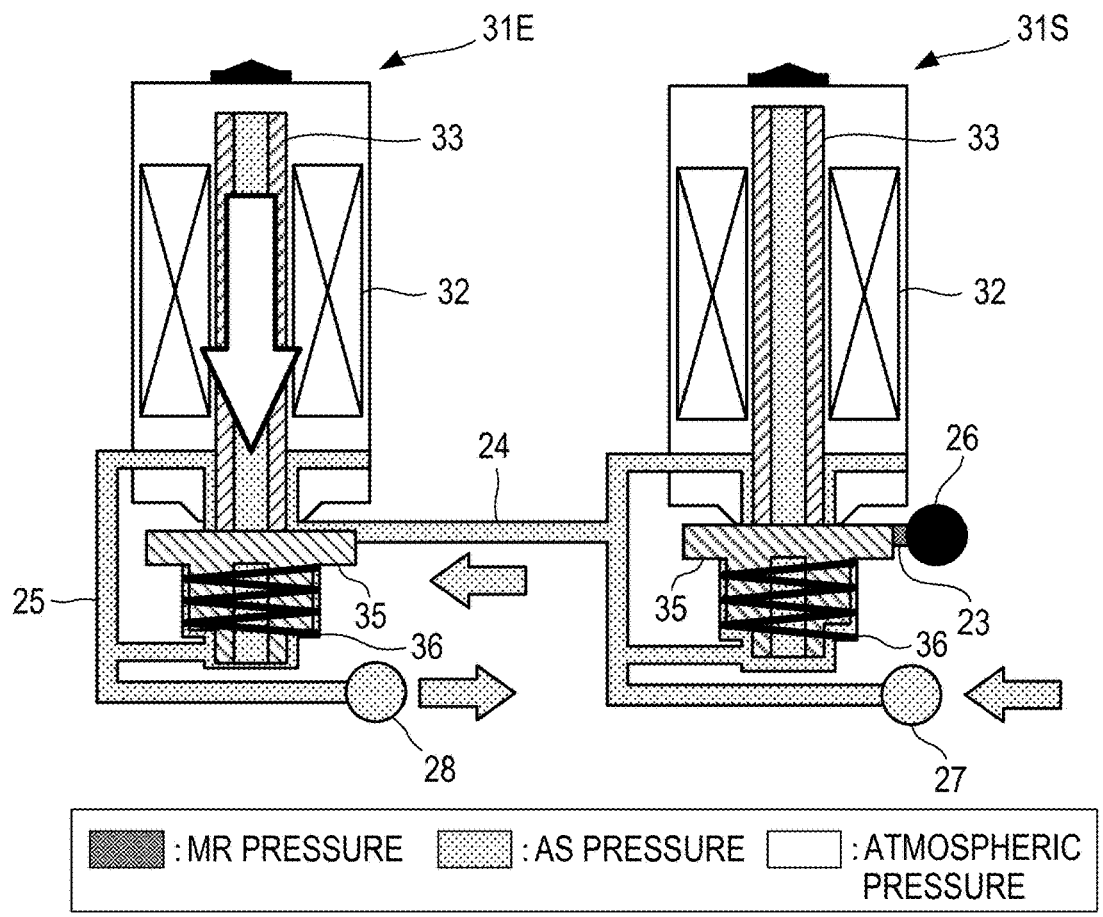
FIG. 7A is a schematic view illustrating the operation of the first electromagnetic valve device.

The valve driver 52 outputs the drive current for opening the valve to the exhaust valve 31E of the first electromagnetic valve device 21A. As illustrated in FIG. 7A, the rod 33 and the valve member 35 are pushed down by the magnetic force generated in the electromagnet 32 in the exhaust valve 31E, whereby the valve is opened. As a result, the air stored in the air spring 11 flows from the air-spring-side opening 27 toward the exhaust-side opening 28 via the valve body intermediate flow path 24 and the valve body exhaust flow path 25, and is exhausted to the atmosphere from the exhaust-side opening 28. At this time, the valve is closed in the supply valve 31S.

Figure 7B:
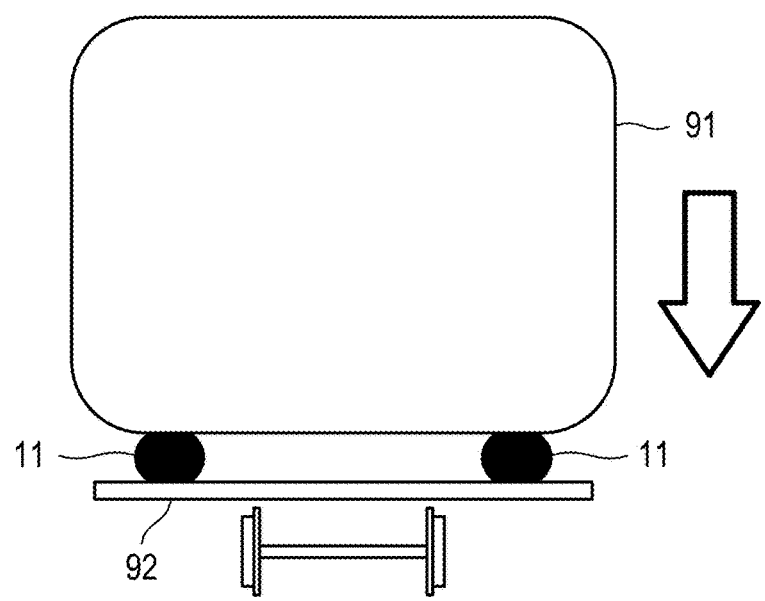
FIG. 7B is a schematic view illustrating the inclination of the vehicle body.

Since the stored air is exhausted to the atmosphere, the air spring 11 contracts as illustrated in FIG. 7B, and the inclination of the vehicle body 91 is restored to be horizontal. The control of exhausting the stored air to the atmosphere is continued until the inclination of the vehicle body 91 is restored to be horizontal.

Figure 8A:
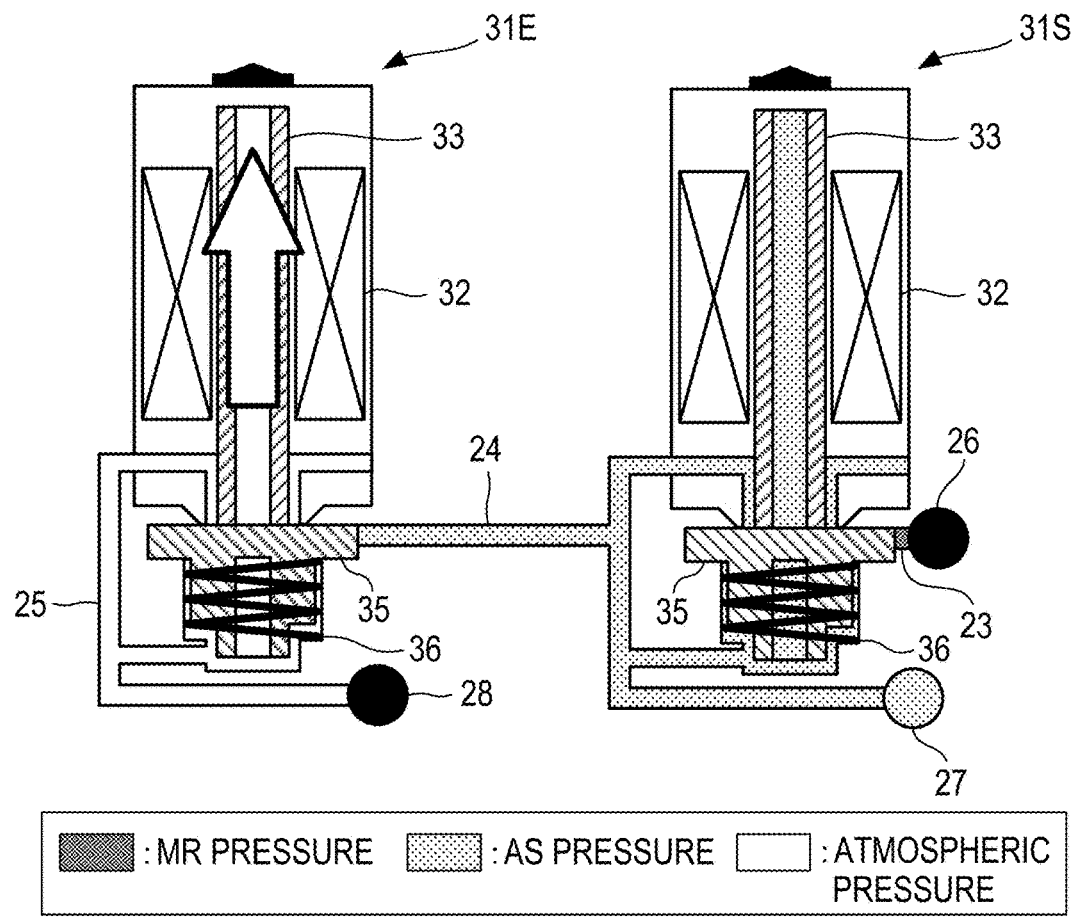
FIG. 8A is a schematic view illustrating the operation of the first electromagnetic valve device.
Figure 8B:
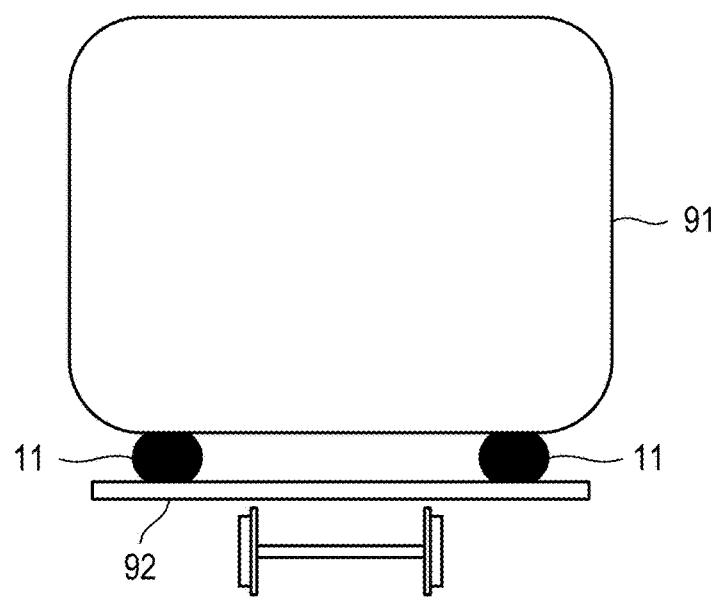
FIG. 8B is a schematic view illustrating the inclination of the vehicle body.

When the inclination of the vehicle body 91 is restored to be horizontal, the valve driver 52 performs control to stop the supply of the drive current for opening the valve. As illustrated in FIG. 8A, the valve member 35 and the rod 33 are pushed upward by the biasing force of the spring 36 in the supply valve 31S, whereby the valve is closed. At this time, the valve is also closed in the exhaust valve 31E. As a result, the air-spring-side opening 27 and the valve body intermediate flow path 24 connected to the air spring 11 are disconnected from the supply-side opening 26 and the exhaust-side opening 28. As illustrated in FIG. 8B, the air spring 11 is held in a state where the vehicle body 91 is horizontal, and the vehicle body 91 is held to be horizontal.

Next, the failure determination method in the determination section 54 of the vehicle body inclination controller 10, which is a feature of the present embodiment, will be described. First, a specific mode of a failure will be described with reference to FIG. 9. The failure mode described here is an example, and other failure modes are not excluded.

Figure 9A:
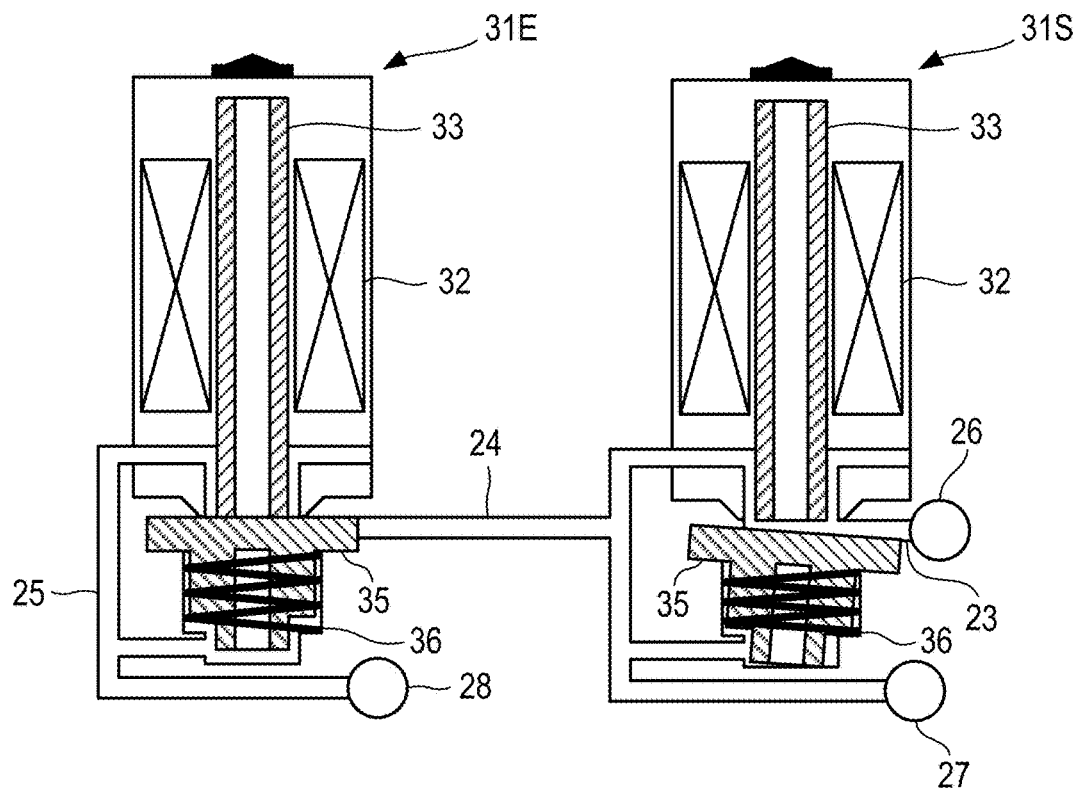
FIG. 9A is a schematic view illustrating a first state of a supply valve.
Figure 9B:
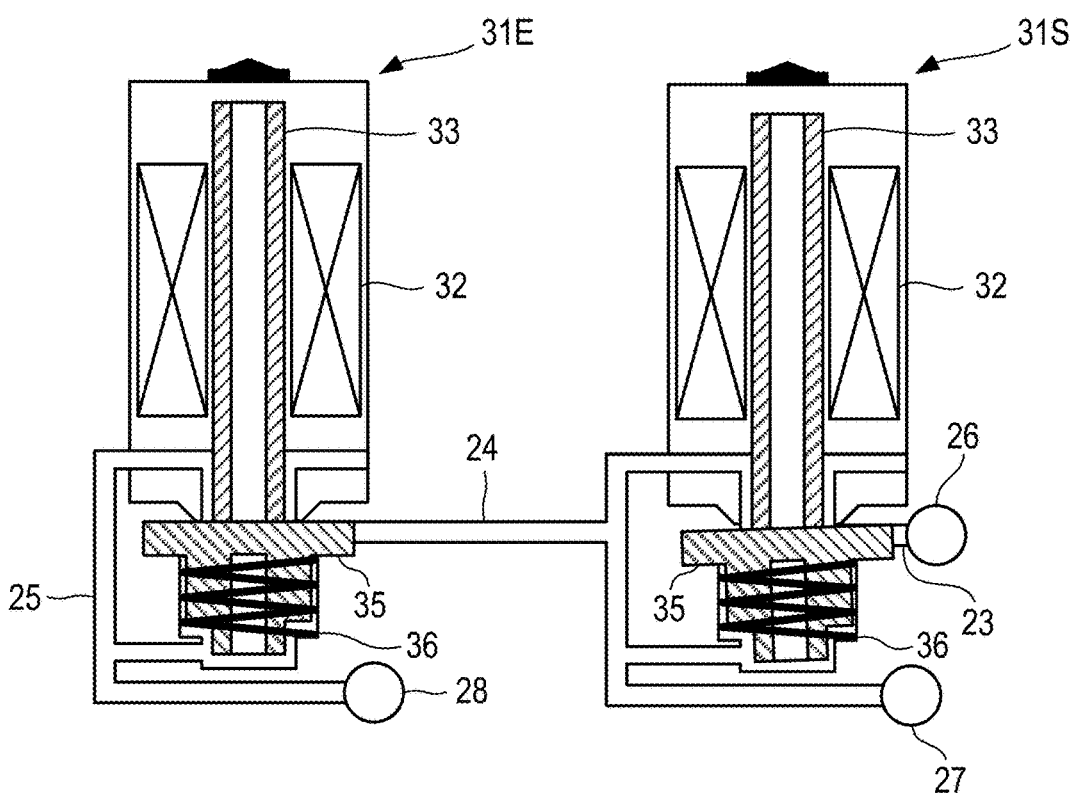
FIG. 9B is a schematic view illustrating a second state of the supply valve.

The failure modes of the first electromagnetic valve device 21A, the second electromagnetic valve device 21B, and the third electromagnetic valve device 21C may include a malfunction of the valve member 35 in the supply valve 31S or the exhaust valve 31E, for example. As an exemplary factor of the malfunction of the valve member 35, it is conceivable that the valve member 35 is inclined and the sealed state is not maintained as illustrated in FIGS. 9A and 9B. FIG. 9A illustrates a state where the valve of the supply valve 31S is in the opened state and does not move or hardly moves (hereinafter also referred to as a "first state"). FIG. 9B illustrates a state where the valve of the supply valve 31S is in the closed state and does not move or hardly moves (hereinafter also referred to as a "second state").

The above-described first state and second state are the failure modes that can occur also in the exhaust valve 31E as in the supply valve 31S, and further, are the failure modes that can occur in any of the first electromagnetic valve device 21A, the second electromagnetic valve device 21B, and the third electromagnetic valve device 21C.

The vehicle body inclination control section 51 performs the following processing to perform failure determination in the first electromagnetic valve device 21A, the second electromagnetic valve device 21B, and the third electromagnetic valve device 21C. First, the acquisition section 53 acquires supply control information AS and exhaust control information AE which are information on the number of times of valve opening and closing in the supply valve 31S and the exhaust valve 31E of the first electromagnetic valve device 21A in a predetermined period.

The acquisition section 53 also acquires supply control information BS and exhaust control information BE which are information on the number of times of valve opening and closing in the supply valve 31S and the exhaust valve 31E of the second electromagnetic valve device 21B in the predetermined period. The acquisition section 53 also acquires supply control information CS and exhaust control information CE which are information on the number of times of valve opening and closing in the supply valve 31S and the exhaust valve 31E of the third electromagnetic valve device 21C in the predetermined period.

The supply control information AS, the exhaust control information AE, the supply control information BS, the exhaust control information BE, the supply control information CS, and the exhaust control information CE, which have been acquired, are stored in a storage of the vehicle body inclination control section 51. A description will be given in the present embodiment by using an example in which the above-described predetermined period is one day, but the predetermined period may be longer or shorter than one day, and is not particularly limited.

The determination section 54 of the vehicle body inclination control section 51 performs the determination of the failure in the first electromagnetic valve device 21A and the second electromagnetic valve device 21B based on the acquired supply control information and exhaust control information by using determination processes having processing contents (1) to (6) as illustrated in FIG. 10.

The number of times of opening and closing in the third electromagnetic valve device 21C is smaller than that of the other electromagnetic valves. Therefore, a description will be given in the present embodiment by using an example in which it is determined that a failure has occurred when there is no opening and closing during the predetermined period. Alternatively, the same determination as in the first electromagnetic valve device 21A and the second electromagnetic valve device 21B described above may be performed for the third electromagnetic valve device 21C.

In the determination process (1), the determination section 54 performs determination on a first state ASO of the supply valve 31S and a first state AEO of the exhaust valve 31E in the first electromagnetic valve device 21A based on a value of a ratio of the exhaust control information AE/the supply control information AS of the first electromagnetic valve device 21A. It is determined that the first state ASO has occurred when the value of the ratio of the exhaust control information AE/the supply control information AS exceeds a first upper limit threshold. It is determined that the first state AEO has occurred when the value of the ratio of the exhaust control information AE/the supply control information AS falls below a first lower limit threshold.

In the determination process (2), the determination section 54 performs determination on a first state BSO of the supply valve 31S and a first state BEO of the exhaust valve 31E in the second electromagnetic valve device 21B based on a value of a ratio of the exhaust control information BE/the supply control information BS of the second electromagnetic valve device 21B. It is determined that the first state BSO has occurred when the value of the ratio of the exhaust control information BE/the supply control information BS exceeds a second upper limit threshold. It is determined that the first state BEO has occurred when the value of the ratio of the exhaust control information BE/the supply control information BS falls below a second lower limit threshold.

In the determination process (3), the determination section 54 performs determination on a second state ASC of the supply valve 31S in the first electromagnetic valve device 21A based on a value of a ratio of the supply control information BS of the second electromagnetic valve device 21B/the supply control information AS of the first electromagnetic valve device 21A. It is determined that the second state ASC has occurred when the value of the ratio of the supply control information BS/the supply control information AS exceeds a third upper limit threshold.

In the determination process (4), the determination section 54 performs determination on a second state AEC of the exhaust valve 31E in the first electromagnetic valve device 21A based on a value of a ratio of the exhaust control information BE of the second electromagnetic valve device 21B/the exhaust control information AE of the first electromagnetic valve device 21A. It is determined that the second state AEC has occurred when the value of the ratio of the exhaust control information BE/the exhaust control information AE exceeds a fourth upper limit threshold.

In the determination process (5), the determination section 54 performs determination on a second state BSC of the supply valve 31S in the second electromagnetic valve device 21B based on a value of a ratio of the supply control information CS of the third electromagnetic valve device 21C/the supply control information BS of the second electromagnetic valve device 21B. It is determined that the second state BSC has occurred when the value of the ratio of the supply control information CS/the supply control information BS exceeds a fifth upper limit threshold.

In the determination process (6), the determination section 54 performs determination on a second state BEC of the exhaust valve 31E in the second electromagnetic valve device 21B based on a value of a ratio of the exhaust control information CE of the third electromagnetic valve device 21C/the exhaust control information BE of the second electromagnetic valve device 21B. It is determined that the second state BEC has occurred when the value of the ratio of the exhaust control information CE/the exhaust control information BE exceeds a sixth upper limit threshold.

The description is given in the present embodiment by using the example in which the thresholds used in the determination process (3) and the determination process (4) are, respectively, the third upper limit threshold and the fourth upper limit threshold which are different, but the same upper limit threshold may be used for them. The same upper limit threshold may be used similarly for the thresholds used in the determination process (5) and the determination process (6).

Next, a specific operation in the case where occurrence of a failure is determined in the determination processes (1) to (6) will be described. When the first state ASO to be determined in the determination process (1) occurs, the supply valve 31S of the first electromagnetic valve device 21A is kept in the state where the valve is opened or the state where it is difficult to close the valve. In this case, even if the control to open the electromagnetic valve is not performed for the supply valve 31S, the supply of the high-pressure air to the air spring 11 is continued, and the expansion amount of the air spring 11 continuously increases.

The vehicle body inclination control section 51 determines that the expansion amount of the air spring 11 is increasing based on an output from the height sensor 57 and performs the control to return the expansion amount of the air spring 11 into a desired range. That is, the control to open the exhaust valve 31E of the first electromagnetic valve device 21A is repeatedly performed. In this manner, the control to open the exhaust valve 31E of the first electromagnetic valve device 21A is repeatedly performed even if the control to open the electromagnetic valve is not performed for the supply valve 31S. As a result, the value of the ratio of the exhaust control information AE/the supply control information AS exceeds the first upper limit threshold.

When the first state AEO to be determined in the determination process (1) occurs, the exhaust valve 31E of the first electromagnetic valve device 21A is kept in the state where the valve is opened or the state where it is difficult to close the valve. In this case, even if the control to open the electromagnetic valve is not performed for the exhaust valve 31E, the exhaust of the stored air to the atmosphere from the air spring 11 is continued and the contraction amount of the air spring 11 continuously increases.

The vehicle body inclination control section 51 determines that the contraction amount of the air spring 11 is increasing based on an output from the height sensor 57 and performs the control to return the contraction amount of the air spring 11 into a desired range. That is, the control to open the supply valve 31S of the first electromagnetic valve device 21A is repeatedly performed. In this manner, the control to open the supply valve 31S of the first electromagnetic valve device 21A is repeatedly performed even if the control to open the electromagnetic valve is not performed for the exhaust valve 31E. As a result, the value of the ratio of the exhaust control information AE/the supply control information AS falls below the first lower limit threshold.

The same operation is performed also in the case where the first state BSO and the first state BEO to be determined in the determination process (2) occur although an object to be determined is only changed from the first electromagnetic valve device 21A to the second electromagnetic valve device 21B, and thus, the detailed description thereof will be omitted.

When the second state ASC to be determined in the determination process (3) occurs, the supply valve 31S of the first electromagnetic valve device 21A is kept in the state where the valve is closed or the state where it is difficult to open the valve. In this case, even if the control to open the electromagnetic valve is performed for the supply valve 31S of the first electromagnetic valve device 21A, a flow rate of the high-pressure air to be supplied to the air spring 11 does not increase or hardly increases, and the expansion amount of the air spring 11 also does not increase or hardly increases.

The vehicle body inclination control section 51 determines that the expansion amount of the air spring 11 does not increase or hardly increases based on the output from the height sensor 57, and performs the control to open the electromagnetic valve with respect to the supply valve 31S of the second electromagnetic valve device 21B in order to bring the expansion amount of the air spring 11 into the desired range. In this manner, the control to open the electromagnetic valve is performed for the supply valve 31S of the second electromagnetic valve device 21B even if the control to open the electromagnetic valve is performed for the supply valve 31S of the first electromagnetic valve device 21A. Thus, the value of the ratio of the supply control information BS/the supply control information AS exceeds the third upper limit threshold.

When the second state AEC to be determined in the determination process (4) occurs, the exhaust valve 31E of the first electromagnetic valve device 21A is kept in the state where the valve is closed or the state where it is difficult to open the valve. In this case, even if the control to open the electromagnetic valve is performed for the exhaust valve 31E of the first electromagnetic valve device 21A, a flow rate of the stored air exhausted from the air spring 11 to the atmosphere does not increase or hardly increases, and the contraction amount of the air spring 11 also does not increase or hardly increases.

The vehicle body inclination control section 51 determines that the contraction amount of the air spring 11 does not increase or hardly increases based on the output from the height sensor 57, and performs the control to open the electromagnetic valve with respect to the exhaust valve 31E of the second electromagnetic valve device 21B in order to bring the contraction amount of the air spring 11 into the desired range. In this manner, the control to open the electromagnetic valve is performed for the exhaust valve 31E of the second electromagnetic valve device 21B even if the control to open the electromagnetic valve is performed for the exhaust valve 31E of the first electromagnetic valve device 21A. Thus, the value of the ratio of the exhaust control information BE/the exhaust control information AE exceeds the fourth upper limit threshold.

The same operation is performed in the case where the second state BSC to be determined in the determination process (5) occurs although objects to be determined are changed from the first electromagnetic valve device 21A to the second electromagnetic valve device 21B and from the second electromagnetic valve device 21B to the third electromagnetic valve device 21C as compared with the case of the determination process (3), and thus, the detailed description thereof will be omitted.

The same operation is performed in the case where the second state BEC to be determined in the determination process (6) occurs although objects to be determined are changed from the first electromagnetic valve device 21A to the second electromagnetic valve device 21B and from the second electromagnetic valve device 21B to the third electromagnetic valve device 21C as compared with the case of the determination process (4), and thus, the detailed description thereof will be omitted.

With the vehicle body inclination controller 10 having the above configuration, the determination based on the above determination processes (1) to (6) is performed to determine the occurrence of the failure in the electromagnetic valve system 20, and thus, it is possible to detect the failure early and accurately.

For example, the failure determination is performed based on the supply control information AS, the supply control information BS, and the supply control information CS (hereinafter referred to as "supply control information AS and the like"), which are the information on the number of times of opening and closing of the supply valve 31S, and the exhaust control information AE, the exhaust control information BE, and the exhaust control information CE (hereinafter referred to as "exhaust control information AE and the like"), which are the information on the number of times of opening and closing of the exhaust valve 31E. Therefore, it is possible to suppress erroneous detection of the failure as compared with the case of determining the occurrence of the failure of the electromagnetic valve system 20 based on the height position of the vehicle body 91, which can be also changed by a factor other than the failure of the electromagnetic valve system 20. In addition, since the failure determination is performed based on the information on the number of times of opening and closing of the supply valve 31S and the exhaust valve 31E, it is possible to detect the failure of the electromagnetic valve system 20 even when a system for supplying the high-pressure air to the air spring 11 or the like is provided double or triple to make the control of the height position of the vehicle body 91 redundant.

In addition, since the determination is performed based on the above-described determination processes (1) to (6), it is easy to detect the failure even in an early stage in the course from a normal state to a failure state as compared with a case of performing a failure determination by a comparison with a failure mode prepared in advance.

Figure 11:
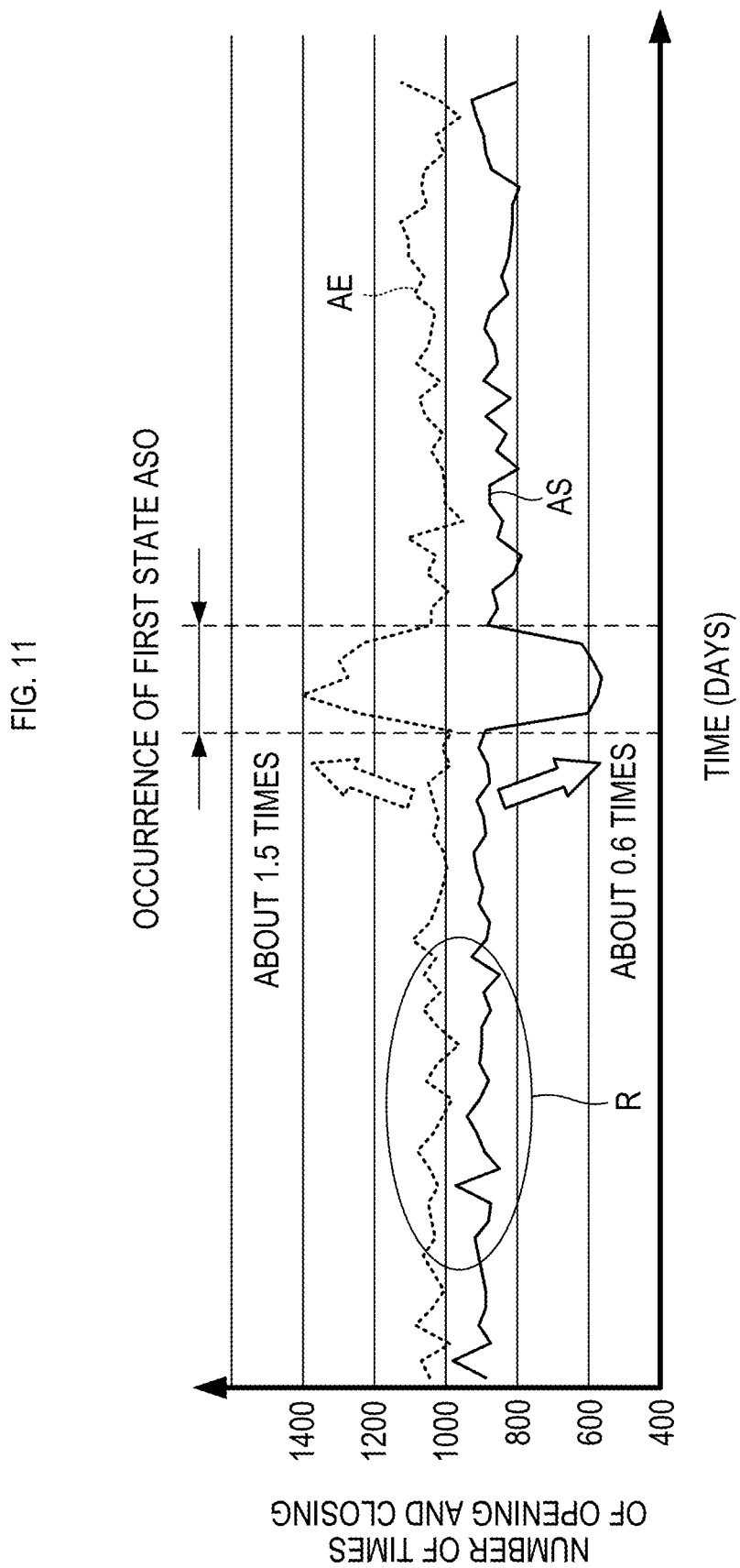

In addition, it is easy to detect the failure as compared with the case of detecting the failure of the electromagnetic valve system 20 by directly using values of the supply control information AS and the like and values of the exhaust control information AE and the like (that is, the case of not using the value of the ratio). For example, when the first state ASO of the supply valve 31S of the first electromagnetic valve device 21A occurs, a graph illustrated in FIG. 11 is obtained if the value of the supply control information AS and the value of the exhaust control information AE are used directly. When the first state ASO occurs, the value of the supply control information AS becomes approximately 0.6 times and the value of the exhaust control information AE becomes approximately 1.5 times as much as the values in the case where the first state ASO does not occur.

Figure 12:
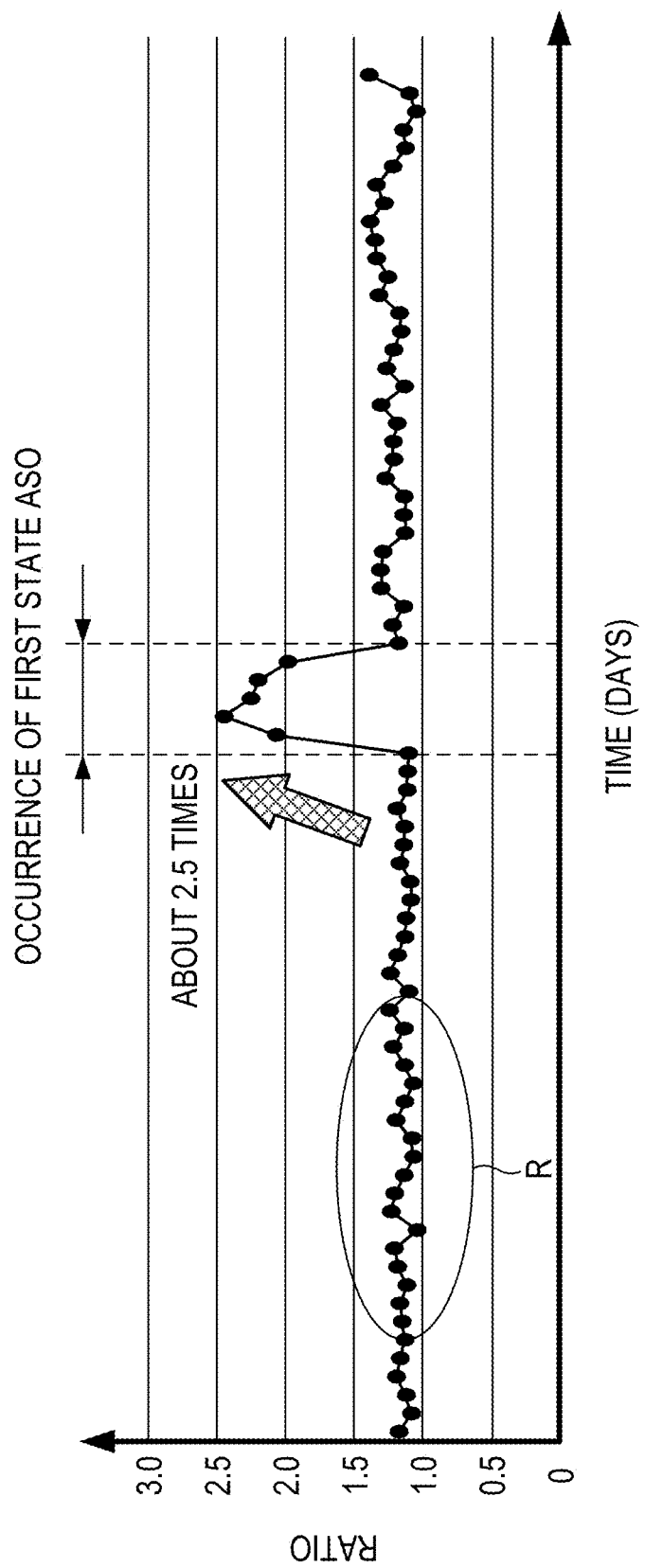
FIG. 12 is a graph illustrating fluctuations of a value obtained by a formula: (value of exhaust control information AE)/(value of supply control information AS).

As contrasted, a graph illustrated in FIG. 12 is obtained by using the value of the ratio between the value of the exhaust control information AE and the value of the supply control information AS, or more specifically, the value of (the value of the exhaust control information AE)/(the value of the supply control information AS). When the first state ASO occurs, the value of the ratio becomes approximately 2.5 times as much as the value in the case where the first state ASO does not occur. When using the value of the ratio, a fluctuation range of the value at the time of occurrence of the first state ASO is large, and it is easy to detect the failure early as compared with the above-described case of not using the value of the ratio.

Furthermore, when a comparison is made for a region R where the first state ASO does not occur, the fluctuation of the value is smaller in the case of using the value of the ratio between the value of the exhaust control information AE and the value of the supply control information AS (see FIG. 12) than in the case of directly using the value of the supply control information AS and the value of the exhaust control information AE (see FIG. 11). Thus, it is easy to distinguish between the state where the first state ASO does not occur and the state where the first state ASO occurs. It is easy to detect the failure early in the case of using the value of the ratio as compared with the above-described case of not using the value of the ratio.

FIGS. 11 and 12 illustrate that each value increases or decreases during a period in which the first state ASO occurs. It is illustrated that thereafter, when the supply valve 31S of the first electromagnetic valve device 21A in which the first state ASO has occurred is repaired or replaced, the value returns to the same value as the time when the first state ASO does not occur.

By performing the determination based on the above-described determination processes (1) to (6), it is possible to determine the first state ASO, the first state AEO, the first state BSO, the first state BEO, the second state ASC, the second state AEC, the second state BSC, and the second state BEC. That is, it is possible to accurately detect the failure in the first electromagnetic valve device 21A, the second electromagnetic valve device 21B, and the third electromagnetic valve device 21C having the different valve capacities.

The information on the number of times of opening and closing of the supply valve 31S is used as the supply control information AS and the like, and the information on the number of times of opening and closing of the exhaust valve 31E is used as the exhaust control information AE and the like. Accordingly, it is easy to acquire the supply control information AS and the like and the exhaust control information AE and the like as compared with the case of using the flow rates of the high-pressure air and the stored air as the supply control information AS and the like and the exhaust control information AE and the like. For example, it is possible to acquire the supply control information AS and the like and the exhaust control information AE and the like by acquiring the signals output from the valve driver 52 to the electromagnetic valve system 20.

In addition, the supply control information AS and the like and the exhaust control information AE and the like are binary information on valve opening and closing. Thus, calculation performed during the determination is easier than in the case of using the flow rates of the high-pressure air and the stored air or an opening degree of a valve as the supply control information AS and the like and the exhaust control information AE and the like.

Second Embodiment

Next, a vehicle body inclination controller according to a second embodiment of the present disclosure will be described with reference to FIG. 13. A basic configuration of the vehicle body inclination controller of the present embodiment is the same as that of the first embodiment, but a configuration of a vehicle body inclination control section is different from that of the first embodiment. Accordingly, in the present embodiment, the configuration of the vehicle body inclination control section will be described with reference to FIG. 13, and descriptions of the other configurations and the like will be omitted.

Figure 13:
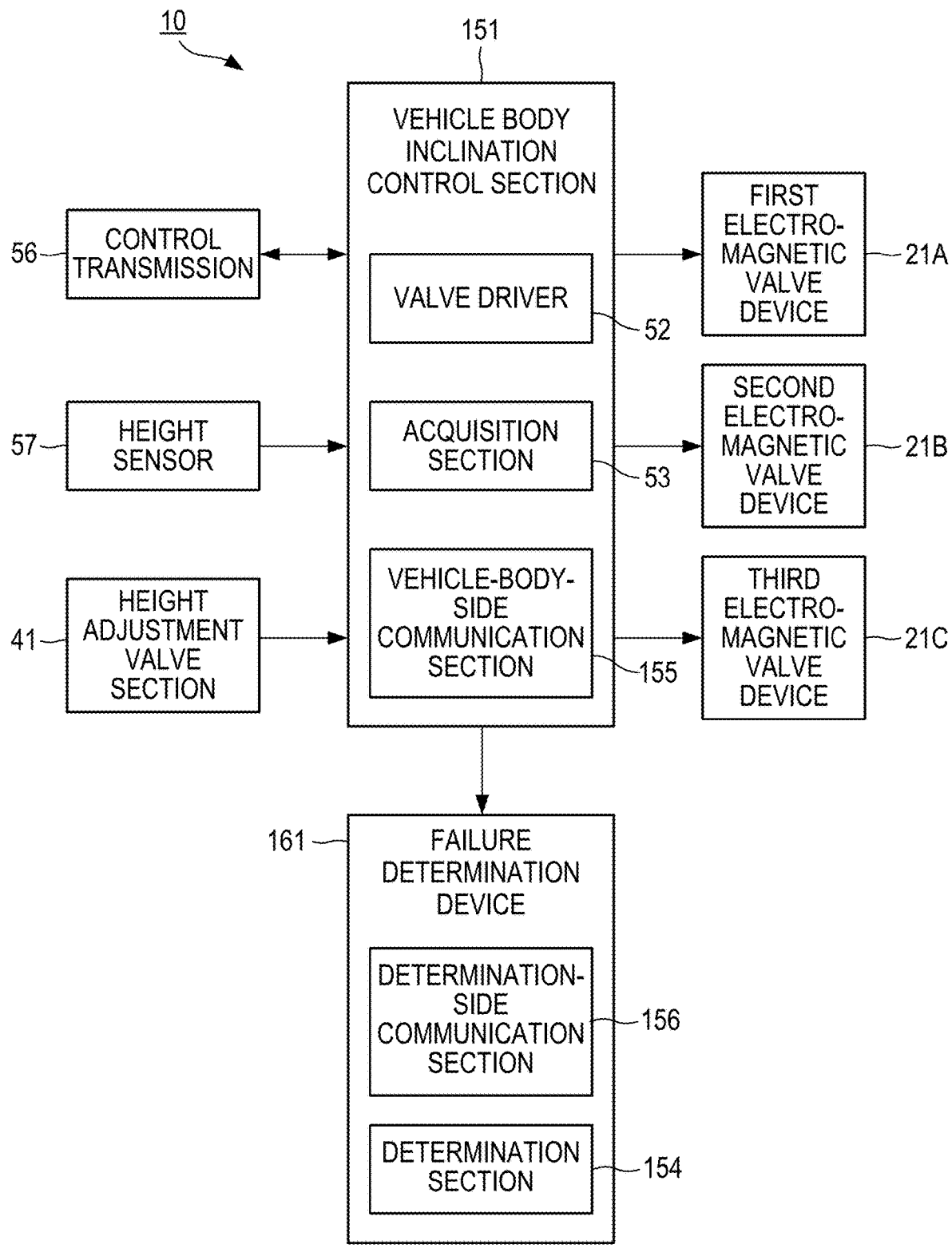
FIG. 13 is a block diagram illustrating a configuration of a vehicle body controller and a failure determination device for a vehicle body inclination controller according to a second embodiment.

As illustrated in FIG. 13, a vehicle body inclination control section 151 of the vehicle body inclination controller 10 according to the present embodiment comprises the valve driver 52, the acquisition section 53, and a vehicle-body-side communication section 155. The vehicle body inclination control section 151 is a microcomputer that comprises a central processing unit (CPU), a ROM, a RAM, an input/output interface, and the like. A control program stored in a storage device such as the ROM causes the CPU, the input/output interface, and the like to function as the valve driver 52, the acquisition section 53, and the vehicle-body-side communication section 155.

In addition, the vehicle body inclination controller 10 according to the present embodiment comprises a failure determination device 161. The failure determination device 161 comprises a determination-side communication section 156 and a determination section 154. The failure determination device 161 is a microcomputer that includes a central processing unit (CPU), a ROM, a RAM, an input/output interface, and the like. A control program stored in a storage device such as the ROM causes the CPU, the input/output interface, and the like to function as the determination-side communication section 156 and the determination section 154.

In the present embodiment, the failure determination device 161 may be provided in a location different from the railway vehicle 90, for example, in a facility such as a data analysis center. In addition, the determination section 154 according to the present embodiment performs the same arithmetic processing and the like as the determination section 54 according to the first embodiment, and the detailed description thereof will be omitted.

The vehicle-body-side communication section 155 and the determination-side communication section 156 can deliver the supply control information AS, the exhaust control information AE, the supply control information BS, the exhaust control information BE, the supply control information CS, and the exhaust control information CE between the vehicle body inclination control section 151 and the failure determination device 161. As a method of delivering the information between the vehicle-body-side communication section 155 and the determination-side communication section 156, a known method such as wireless communication or information delivery with an information medium can be used.

Since an operation of the vehicle body inclination controller 10 in the present embodiment is the same as that of the first embodiment, the description thereof will be omitted. In addition, a failure determination method is the same as that of the first embodiment except that the delivery of information such as the supply control information AS and the exhaust control information AE via the vehicle-body-side communication section 155 and the determination-side communication section 156 is different, and thus, the description thereof will be omitted.

With the above configuration, the failure determination device 161 can be provided at the location different from the railway vehicle 90 by providing the vehicle-body-side communication section 155 and the determination-side communication section 156. For example, the failure determination device 161 having the determination section 154 can be provided in the facility such as the data analysis center.

A technical scope of the present disclosure is not limited to the above embodiments, and various modifications can be made within a range not departing from a gist of the present disclosure.

For example, the description has been given in the above embodiment regarding the example in which the supply control information AS and the exhaust control information AE are the information on the number of times of valve opening and closing of the supply valve 31S and the exhaust valve 31E in the first electromagnetic valve device 21A. The supply control information BS and the exhaust control information BE are the information on the number of times of valve opening and closing of the supply valve 31S and the exhaust valve 31E in the second electromagnetic valve device 21B. The supply control information CS and the exhaust control information CE are the information on the number of times of valve opening and closing of the supply valve 31S and the exhaust valve 31E in the third electromagnetic valve device 21C. Alternatively, an air flow sensor may be additionally provided, and information on the flow rate of the high-pressure air and the flow rate of the stored air passing through the supply valve 31S and the exhaust valve 31E in the first electromagnetic valve device 21A during a predetermined period may be used as the supply control information AS and the exhaust control information AE. Information on the flow rate of the high-pressure air and the flow rate of the stored air passing through the supply valve 31S and the exhaust valve 31E in the second electromagnetic valve device 21B during the predetermined period may be used as the supply control information BS and the exhaust control information BE. Information on the flow rate of the high-pressure air and the flow rate of the stored air passing through the supply valve 31S and the exhaust valve 31E in the third electromagnetic valve device 21C during the predetermined period may be used as the supply control information CS and the exhaust control information CE.

In this manner, the ranges of the first electromagnetic valve device 21A, the second electromagnetic valve device 21B, and the third electromagnetic valve device 21C that enable failure determination are widened. More specifically, the failure determination can be performed not only for an on-off valve whose valve opening degree in the supply valve 31S and the exhaust valve 31E varies simply between opening and closing but also for a flow control valve whose valve opening degree consecutively varies.

Alternatively, instead of providing the additional air flow sensor, based on a signal for controlling a valve opening degrees output from the valve driver 52, valve opening degree information of the supply valve 31S and the exhaust valve 31E in the first electromagnetic valve device 21A may be used as the supply control information AS and the exhaust control information AE. Valve opening degree information of the supply valve 31S and the exhaust valve 31E in the second electromagnetic valve device 21B may be used as the supply control information BS and the exhaust control information BE. Valve opening degree information of the supply valve 31S and the exhaust valve 31E in the third electromagnetic valve device 21C may be used as the supply control information CS and the exhaust control information CE.

In this manner, the ranges of the first electromagnetic valve device 21A, the second electromagnetic valve device 21B, and the third electromagnetic valve device 21C that enable failure determination are widened. In addition, it is easy to acquire the supply control information and the exhaust control information as compared with the case of using the flow rate of air as the supply control information and the exhaust control information.

What is claimed is:

1. A vehicle body inclination controller comprising:
an air spring configured to support a vehicle body;
an air reservoir configured to supply high-pressure air to the air spring to support the vehicle body, the high-pressure air being stored at a pressure higher than the pressure of the air stored in the air spring;
a plurality of valve devices, each of which includes a supply valve that controls supply of the high-pressure air from the air reservoir to the air spring and an exhaust valve that controls exhaust of the air stored in the air spring from the air spring to an outside, the plurality of valve devices being arranged in parallel and connected with a path for supplying the high-pressure air from the air reservoir to the air spring and with a path for exhausting the stored air from the air spring to the outside;

a valve driver that configured to output a first signal to the supply valve of each of the valve devices for controlling the supply of the high-pressure air and a second signal to the exhaust valve of each of the valve devices for controlling the exhaust of the stored air;

an acquisition section configured to acquire supply control information including information relating to supply control of the high-pressure air with the supply valve of at least one of the plurality of the valve devices and exhaust control information including information relating to exhaust control of the stored air with the exhaust valve of at least one of the plurality of valve devices; and a determination section that configured to at least one of:

compare a first ratio between the supply control information of the supply valve of one of the plurality of valve devices and the exhaust control information of the exhaust valve of the one of the plurality of valve devices with a first predetermined threshold, compare a second ratio between the supply control information of one of the supply valves of a first pair of the plurality of valve devices and the supply control information of the other one of the supply valves of the first pair of the the plurality of valve devices with a second predetermined threshold, or compare a third ratio between the exhaust control information of one of the exhaust valves of a second pair of the plurality of valve devices and the exhaust control information of the other one of the exhaust valves of the second pair of the plurlality of valve devices with a third predetermined threshold, the first pair of the plurality of valve devices being the same as or different from the second pair of the plurality of valve devices, wherein the determination section is configured to at least one of:

determine that a failure has occured in the one of the plurality of valve devices when the first ratio exceeds the first predetermined threshold, determine that a failure has occurred in at least one of the first pair of the plurality of valve devices when the second ratio exceeds the second predetermined threshold, or determine that a failure has occurred in at least one of the second pair of the plurality of valve devices when the third ratio exceeds the third predetermined threshold.

2. The vehicle body inclination controller according to claim 1, wherein at least one of the plurality of valve devices has a valve capacity different from a valve capacity of another valve device among the plurality of valve devices, wherein the valve capacity is a flow rate of the high-pressure air passing through the supply valve in a predetermined time and a flow rate of the stored air passing through the exhaust valve in the predetermined time.

3. The vehicle body inclination controller according to claim 2, wherein the plurality of valve devices include:

a first valve device having a first valve capacity;

a second valve device having a second valve capacity with a larger flow rate of air passing through the second valve device in the predetermined time than the first valve capacity; and a third valve device having a third valve capacity with a larger flow rate of air passing through the third valve device in the predetermined time than the second valve capacity, wherein the first ratio is a ratio between the supply control information and the exhaust control information of the first, second or third valve device, the second ratio is at least one of a ratio between the supply control information of the first valve device and the supply control information of the second valve device, or a ratio between the supply control information of the second valve device and the supply control information of the third valve device, and the third ratio is at least one of a ratio between the exhaust control information of the first valve device and the exhaust control information of the second valve device, or a ratio between the exhaust control information of the second valve device and the exhaust control information of the third valve device.

4. The vehicle body inclination controller according to claim 2, wherein, the valve capacities of the first pair of the plurality of valve devices are adjacent to each other among the valve capacities of the plurality of valve devices, and the valve capacities of the second pair of the plurality of valve devices are adjacent to each other among the valve capacities of the plurality of valve devices.

5. The vehicle body inclination controller according to claim 1, further comprising a communication section that transmits the supply control information and the exhaust control information, acquired by the acquisition section, to the determination section.

6. The vehicle body inclination controller according to claim 1, wherein the valve driver is configured to output a signal for controlling opening and closing of the supply valve and a signal for controlling opening and closing of the exhaust valve, the supply control information includes a number of times the supply valve opens and closes during a predetermined period, and the exhaust control information includes a number of times the exhaust valves opens and closes during the predetermined period.

7. The vehicle body inclination controller according to claim 1, wherein the supply control information is a flow rate of the high-pressure air passing through the supply valve during a predetermined, and the exhaust control information is a flow rate of the stored air passing through the exhaust valve during the predetermined period.

8. The vehicle body inclination controller according to claim 1, wherein the valve driver is configured to control the degree that the supply valve opens and to control the degree that the exhaust valve opens, the supply control information includes information related to the degree that the supply valve is opened, and the exhaust control information includes information related to the degree that the exhaust valve is opened.

9. A failure determination device for a vehicle body inclination controller,
wherein the vehicle body inclination controller comprises:
an air spring configured to support a vehicle;
an air reservoir configured to supply high-pressure air to the air spring to support the vehicle body, the high-pressure air being stored at a pressure that is higher than the pressure of the air stored in the air spring;
a plurality of valve devices, each of which includes a supply valve that controls supply of the high-pressure air from the air reservoir to the air spring and an exhaust valve that controls exhaust of the air stored in the air spring from the air spring to an outside, the plurality of valve devices being arranged in parallel and connected with a path for supplying the high-pressure air from the air reservoir to the air spring and with a path for exhausting the stored air from the air spring to the outside;
a valve driver configured to output a first signal to the supply valve of each of the plurality of valve devices for controlling the supply of the high-pressure air and a second signal to the exhaust valve of each of the plurality of valve devices for controlling the exhaust of the stored air; and
an acquisition section configured to acquire supply control information including information relating to supply control of the high-pressure air with the supply valve of at least one of the plurality of valve devices and exhaust control information including information relating to exhaust control of the stored air with the exhaust valve of at least one of the plurality of valve devices,
the failure determination device comprising:
a communication section that is configured to receive the supply control information and the exhaust control information acquired by the acquisition section; and
a determination section that is configured to at least one of:
compare a first ratio between the supply control information of the supply valve of one of the plurality of valve devices and the exhaust control information of the exhaust valve of the one of the plurality of valve devices with a first predetermined threshold,
compare a second ratio between the supply control information of one of the supply valves of a first pair of the plurality of valve devices and the supply control information of the other one of the supply valves of the first pair of the plurality of valve devices with a second predetermined threshold, or
compare a third ratio between the exhaust control information of one of the exhaust valves of a second pair of the plurality of valve devices and the exhaust control information of the other one of the exhaust valves of the second pair of the plurality of valve devices with a third predetermined threshold, the first pair of the plurality of valve devices being the same as or different from the second pair of the plurality of valve devices,
wherein the determination section is configured to at least one of:
determine that a failure has occurred in the one of the plurality of valve devices when the first ratio exceeds the first determination threshold,
determine that a failure has occurred in at least one of the first pair of the plurality of valve devices when the second ratio exceeds the second predetermined threshold, or
determine that a failure has occurred in at least one of the second pair of the plurality of valve devices when the third ratio exceeds the third predetermined threshold.

* * * * *